US009495415B2

(12) United States Patent
Arsenault et al.

(10) Patent No.: US 9,495,415 B2
(45) Date of Patent: Nov. 15, 2016

(54) METHOD AND SYSTEM FOR SEARCHING FOR CONTENT IN A USER DEVICE

(75) Inventors: Robert G. Arsenault, Redondo Beach, CA (US);
(Continued)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 13/222,986

(22) Filed: Aug. 31, 2011

(65) Prior Publication Data

US 2012/0054211 A1 Mar. 1, 2012

Related U.S. Application Data

(60) Provisional application No. 61/378,850, filed on Aug. 31, 2010.

(51) Int. Cl.
*G06F 17/30* (2006.01)
*H04N 5/445* (2011.01)
(Continued)

(52) U.S. Cl.
CPC ......... *G06F 17/30424* (2013.01); *G06F 17/30* (2013.01); *G06F 17/30823* (2013.01);
(Continued)

(58) Field of Classification Search
CPC ............ H04N 5/44543; H04N 21/4828; H04N 21/4622; H04N 21/4668; H04N
(Continued)

(56) References Cited

U.S. PATENT DOCUMENTS 5,778,361 A * 7/1998 Nanjo et al.
7,228,556 B2 * 6/2007 Beach et al. ............... 725/53
(Continued)

FOREIGN PATENT DOCUMENTS

EP 1395056 A1 3/2004
WO 2006/060311 A1 6/2006

OTHER PUBLICATIONS

"Index (search engine)—Wikipedia"; Jul. 9, 2010; XP55014905; Retrieved from the Internet: URL: http://en.wikipedia.org/w/index.php?title=Search_engine_indexing&direction=next&oldid=372561882&printable=yes; [retrieved on Dec. 14, 2011].
(Continued)

*Primary Examiner* — Usmaan Saeed
*Assistant Examiner* — Paul Kim
(74) *Attorney, Agent, or Firm* — Harness, Dickey & Pierce, P.L.C.

(57) ABSTRACT

A system and method for searching for content in a user device includes a receiver receiving a plurality of data objects. The user device includes a search module comprising a parsing module parsing search data from the plurality of data objects and a memory interface module storing search data within a memory of the user device. The search module comprises a search performance module searching the search data in response to a search query. The search module comprises a search results module generating search results from the search data. The user device is associated with a display that displays the search results.

83 Claims, 25 Drawing Sheets

(75) Inventors: Eric J. Bennett, Los Angeles, CA (US); Eric H. Chang, Torrance, CA (US); Gordon H. Chen, Manhattan Beach, CA (US); Kenny C. Chen, Fountain Valley, CA (US); Justin T. Dick, Salt Lake City, UT (US); Flemming R. Hansen, Los Angeles, CA (US); Yoonjung Kim, Los Angeles, CA (US); Peter Leong, Redondo Beach, CA (US); Andrew J. Schneider, Irvine, CA (US); Jeffrey L. Sharkey, Hermosa Beach, CA (US); Marcin Spatzier, Los Angeles, CA (US); Huy Q. Tran, Westminster, CA (US); Melissa H. Tullues, Culver City, CA (US); Leo Wu, Irvine, CA (US)

(51) Int. Cl.

| | | |
|---|---|---|
| *H04N 21/462* | (2011.01) | |
| *H04N 21/466* | (2011.01) | |
| *H04N 21/482* | (2011.01) | |
| *H04N 21/258* | (2011.01) | |
| *H04N 21/414* | (2011.01) | |
| *H04N 21/45* | (2011.01) | |
| *H04N 21/4627* | (2011.01) | |
| *H04N 21/4722* | (2011.01) | |
| *H04N 21/475* | (2011.01) | |

(52) U.S. Cl.
CPC ...... *H04N 5/44543* (2013.01); *H04N 21/4622* (2013.01); *H04N 21/4668* (2013.01); *H04N 21/4828* (2013.01); *H04N 21/25841* (2013.01); *H04N 21/25891* (2013.01); *H04N 21/41407* (2013.01); *H04N 21/4524* (2013.01); *H04N 21/4532* (2013.01); *H04N 21/4627* (2013.01); *H04N 21/4722* (2013.01); *H04N 21/4755* (2013.01)

(58) Field of Classification Search
CPC ...................... 21/4532;H04N 21/41407; H04N 21/4722; H04N 21/4524; H04N 21/4627;H04N 21/4755; H04N 21/2584; H04N 21/2589; G06F 17/30; G06F 17/30424; G06F 17/30823
See application file for complete search history.

(56) References Cited

U.S. PATENT DOCUMENTS

| | | | | |
|---|---|---|---|---|
| 8,135,580 | B1* | 3/2012 | Jin et al. | 704/9 |
| 2002/0199188 | A1* | 12/2002 | Sie et al. | 725/35 |
| 2008/0104057 | A1* | 5/2008 | Billmaier et al. | 707/5 |
| 2009/0052863 | A1* | 2/2009 | Parmar et al. | 386/83 |
| 2009/0216752 | A1* | 8/2009 | Terui et al. | 707/5 |

OTHER PUBLICATIONS

Williams, Hugh E.; Zobel, Justin; Bahle, Dirk; "Fast Phrase Querying With Combined Indexes"; ACM Transactions on Information Systems, ACM; New York, New York, US; vol. 22. No. 4; Oct. 1, 2004; pp. 579-594; XP008126055; ISSN: 1046-8188; Section 3 and 4, table I, figures 1, 2, 6.

Hodge, Victoria J.; Austin, Jim; "An Evaluation of Standard Retrieval Algorithms and a Weightless Neural Approach"; Neural Networks, 2000; IJCNN 2000; Proceedings of the IEEE-INNS-ENNS International Joint Conference; Jul. 24-27, 2000; Piscataway, NJ, US; IEEE; vol. 5; Jul. 24, 2000; pp. 591-596; XP010507072; ISBN: 978-0-7695-0619-7; Section I Data Structures.

Zobel, Justin; Moffat, Alistair; "Inverted Files for Text Search Engines"; ACM Computing Surveys, ACM; New York, NY, US; vol. 38, No. 2; Jul. 1, 2006 (Jul. 1, 2007); pp. 1-56; XP007903028; ISSN: 0360-0300; Section 3: Indexing and query evaluation, figures 4, 5.

Manning, Christopher D. et al.; "An Introduction to Information Retrieval, Chapter 6: Scoring, term weighting and the vector space model"; Apr. 1, 2009; XP55015730; Retrieved from the Internet: URL:http://nlp.stanford.edu/IR-book/pdf/06vectorpdf; [retrieved on Jan. 4, 2012]; Introduction and section 6.1.

International Search Report and Written Opinion dated Jan. 20, 2012 in International Application No. PCT/US2011/049395 filed Aug. 26, 2011 by Robert G. Arsenault et al.

* cited by examiner

METHOD AND SYSTEM FOR SEARCHING FOR CONTENT IN A USER DEVICE

TECHNICAL FIELD

The present disclosure relates to a content processing and delivery system and, more specifically, to a method and system for searching content available in a content delivery system and displaying the results therefrom.

BACKGROUND

The statements in this section merely provide background information related to the present disclosure and may not constitute prior art.

Satellite television is increasing in popularity due to the ever-increasing amount of programming as well as the quality of programming. Programming includes standard national (CONUS) broadcasts, local or regional station broadcasts, on-demand content and interactive content.

While providing a large amount of content to consumers is desirable, it is also desirable to allow the consumers to easily find programming to view. Currently, a program guide provides a graphical representation of the content to a user. A program guide is typically a list of programs, times, and channels for the various content. Only a limited number of guide material may be provided on the screen at one time. Thus, the program guide, while useful, becomes a slow way of finding desirable content in a large amount of available content. Further, the program guide provides a listing of content without the interest of the users.

Searching by key words is another method for providing content suggestions to users. One known method for searching is communicating search terms to a server through a network and receiving and displaying search results in response thereto. This is the same way in which an Internet search is performed. In a satellite television world, not all set top boxes are coupled to a network. Therefore, this solution may be undesirable.

The processing resources within a set top box are also somewhat limited. Therefore, providing content suggestions to users should not burden the set top box.

SUMMARY

The present disclosure provides a system and method for searching content and displaying the content in an efficient manner for the user to quickly find desirable content.

In one aspect of the disclosure, a method includes receiving a plurality of data objects at a user device, parsing search data from the plurality of data objects at the user device, storing search data within the user device, in response to a search query, searching the search data stored within the user device, generating search results from the search data and displaying search results.

In another aspect of the disclosure, a system and method for searching for content in a user device includes a receiver receiving a plurality of data objects. The user device includes a search module comprising a parsing module parsing search data from the plurality of data objects and a memory interface module storing search data within a memory of the user device. The search module comprises a search performance module searching the search data in response to a search query. The search module comprises a search results module generating search results from the search data. The user device is associated with a display that displays the search results.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
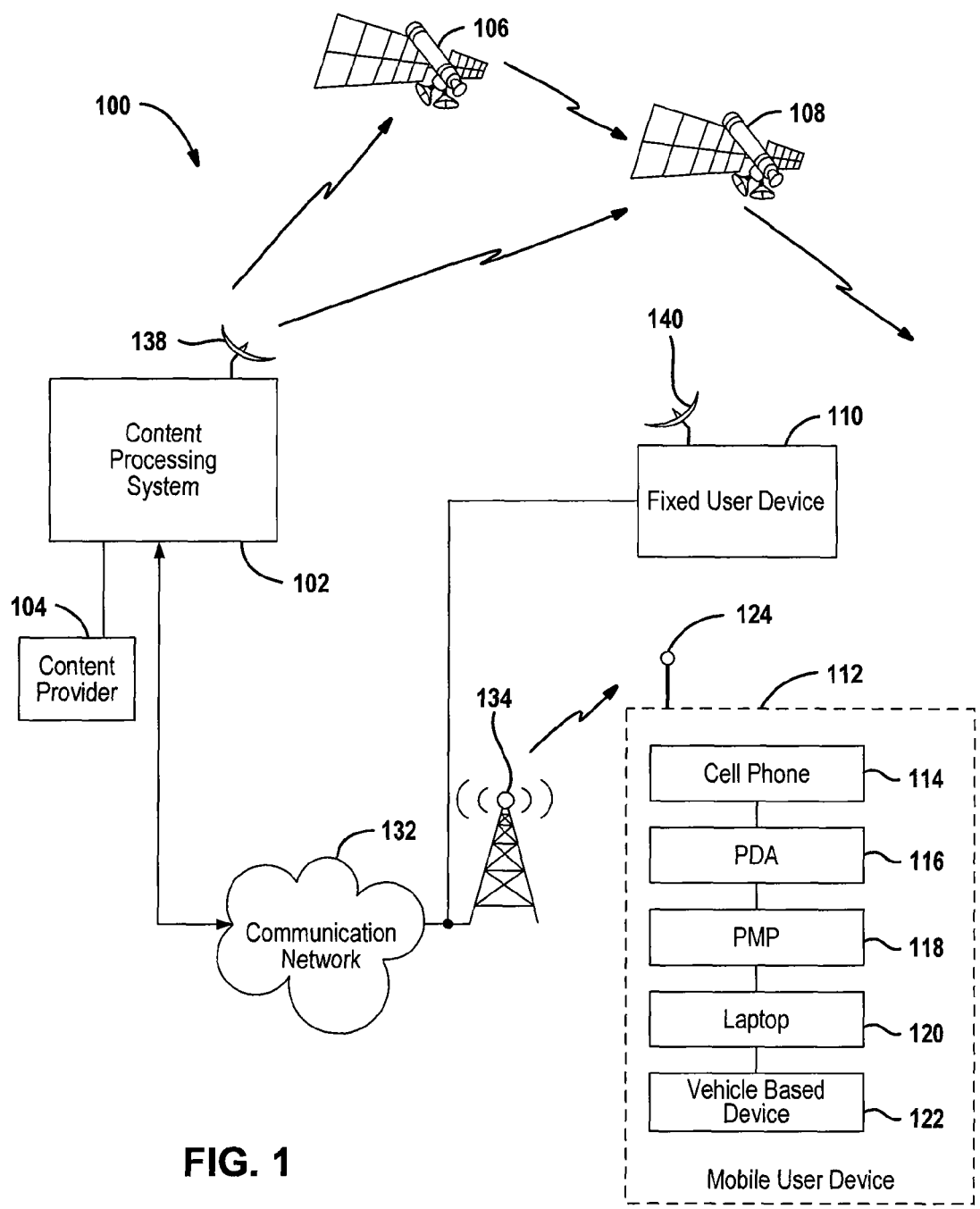
FIG. 1 is a schematic illustration of a communication system according to the disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The present disclosure is set forth with respect to a satellite broadcast television system. In particular, the following disclosure is made with respect to DIRECTV® broadcast services and systems. It should be understood that many other delivery systems are readily applicable to the disclosed systems and methods. Such systems include other wireless distribution systems, wired or cable distribution systems, cable television distribution systems, ultra high frequency (UHF)/very high frequency (VHF) radio frequency systems or other terrestrial broadcast systems (e.g., multi-channel multi-point distribution system (MMDS), local multi-point distribution system (LMDS), etc.), Internet-based distribution systems, cellular distribution systems, power-line broadcast systems, any point-to-point and/or multicast Internet protocol (IP) delivery network, and fiber optic networks. Further, the different functions collectively allocated among a head end (HE), integrated receiver/decoders (IRDs) and a content delivery network (CDN) as described below may be reallocated as desired without departing from the intended scope of the present patent.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

The following description refers to communicating content, data, control signals, data objects and the like. The content data, control signals, and data objects are communicated electronically using electrical or optical control signals.

Referring now to FIG. 1, a content communication system 100 includes a content processing system 102 that is used as a processing and transmission source, a plurality of content providers, one of which is shown at reference numeral 104 and a first satellite 106. A second satellite 108 may also be incorporated into the system. The satellites 106, 108 may be used to communicate different types of information or different portions of various contents from the content processing system 102. The system 100 also includes a plurality of fixed user devices 110 such as integrated receiver/decoders (IRDs). Wireless communications are exchanged between the content processing system 102 and the fixed user devices 110 through one or more of the satellites 106, 108. The wireless communications may take place at any suitable frequency, such as but not limited to, for example, Ka band and/or Ku-band frequencies.

A mobile user device 112 may also be incorporated into the system. The mobile user device 112 may include, but is not limited to, a cell phone 114, a personal digital assistant 116, a portable media player 118, a laptop computer 120, or a vehicle-based device 122. It should be noted that several mobile devices 112 and several fixed user devices 110 may be used in the communication system 100. The mobile devices 112 may each have a separate antenna generally represented by antenna 124.

In addition to communication via the satellites 106, 108, various types of information such as security information, encryption-decryption information, content, or content portions may be communicated terrestrially. A communication network 132 such as the public switched telephone network (PSTN), a terrestrial wireless system, stratospheric platform, an optical fiber, or the like may be used to terrestrially communicate with the fixed user device 110 or the mobile user device 112. To illustrate the terrestrial wireless capability an antenna 134 is illustrated for wireless terrestrial communication to the mobile user device 112.

Data or content provided to content processing system 102 from the media source 104 may be transmitted, for example, via an uplink antenna 138 to the satellites 106,108, one or more of which may be a geosynchronous or geostationary satellite, that, in turn, rebroadcast the information over broad geographical areas on the earth that include the user devices 110, 112. The satellites may have inter-satellite links as well. Among other things, the example content processing system 102 of FIG. 1 provides program material to the user devices 110, 112 and coordinates with the user devices 110, 112 to offer subscribers pay-per-view (PPV) program services and broadband services, including billing and associated decryption of video programs. Non-PPV (e.g. free or subscription) programming may also be received. A carousel of multiple program materials may be scheduled within the content processing system 102 whereby the satellites 106, 108 may be used to communicate metadata and content to the user devices 110, 112. The repetition rate and blocks of content and metadata may vary. To receive the information rebroadcast by satellites 106, 108, each for user device 110 is communicatively coupled to a receiver or downlink antenna 140.

Security of assets broadcast via the satellites 106, 108 may be established by applying encryption and decryption to assets or content during content processing and/or during broadcast (i.e., broadcast encryption). For example, an asset may be encrypted based upon a control word (CW) known to the content processing system 102 and known to the user devices 110, 112 authorized to view and/or playback the asset. In the illustrated example communication system 100, for each asset the content processing system 102 generates a control word packet (CWP) that includes, among other things, a time stamp, authorization requirements and an input value and then determines the control word (CW) for the asset by computing a cryptographic hash of the contents of the CWP. The CWP is also broadcast to the user devices 110, 112 via the satellites 106, 108. The user devices authorized to view and/or playback the broadcast encrypted asset will be able to correctly determine the CW by computing a cryptographic hash of the contents of the received CWP. If the user device 110 is not authorized, the user device 110 will not be able to determine the correct CW that enables decryption of the received broadcast encrypted asset. The CW may be changed periodically (e.g., every 30 seconds) by generating and broadcasting a new CWP. In an example, a new CWP is generated by updating the timestamp included in each CWP. Alternatively, a CWP could directly convey a CW either in encrypted or unencrypted form. Other examples of coordinated encryption and decryption abound, including for example, public/private key encryption and decryption.

Figure 2:
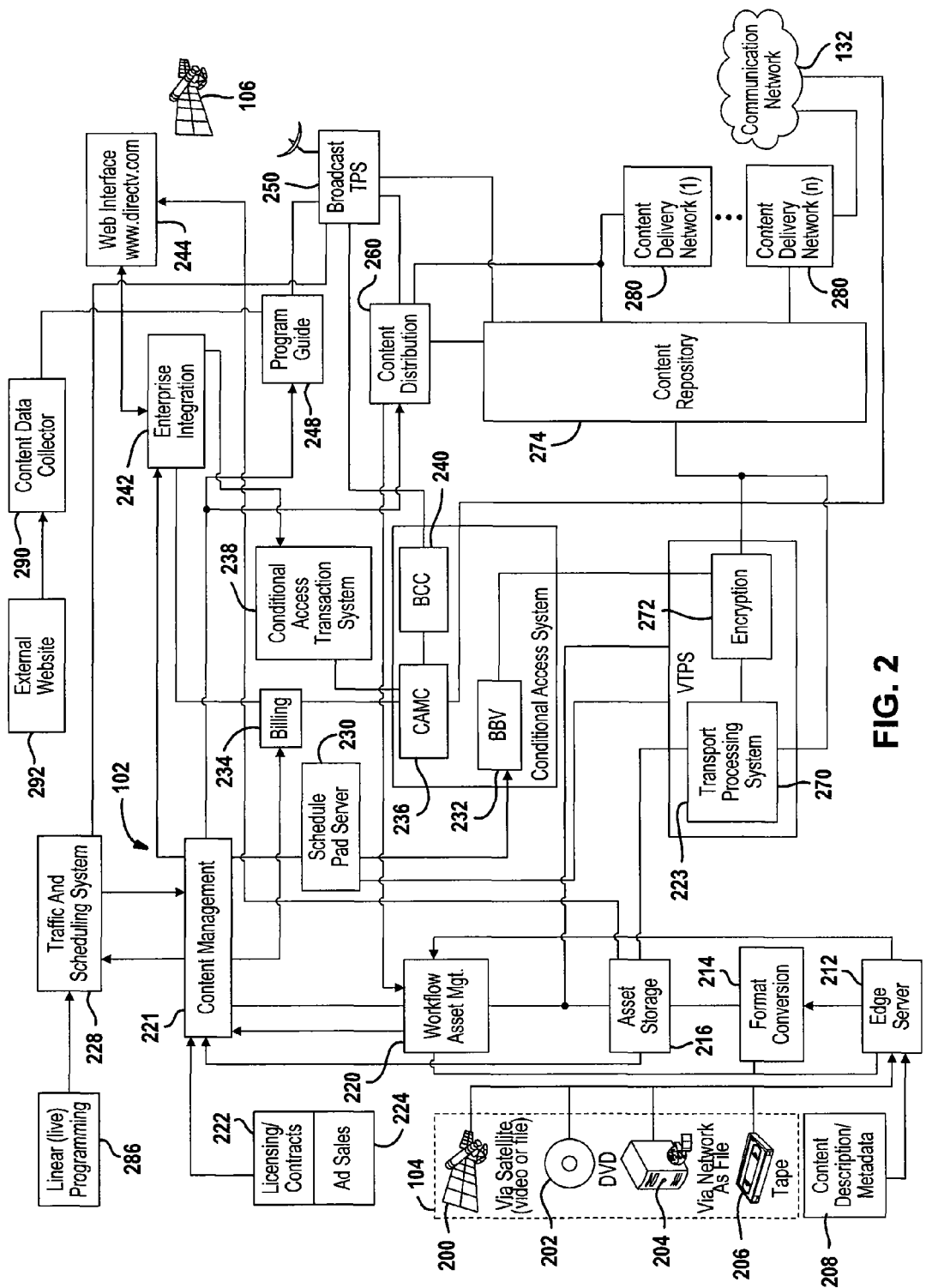
FIG. 2 is a detailed block diagrammatic view of the content processing system of FIG. 1.

Referring now to FIG. 2, the content processing system 102 of FIG. 1 is illustrated in further detail. The content provider 104 may include various types of content providers, including those that provide content by way of a satellite 200, digital versatile disc (DVD) 202, via a network as a file in 204, by way of tapes and other means. The content provider 104 may also provide graphics, content description, and other metadata 208 to the system.

The content providers 104 may be various types of content providers and provide various types of content including advertising content such as row advertising (ads). The content providers may provide various types of information including advertising information. Advertising providers may provide information on various products or various available or future content. It should be noted that the advertising provider and the content provider may be one in the same.

Content providers may also have a home page within the present system. Briefly, the home page is a portion of the program guide for selecting content to be downloaded to the user device. The system operator may also have its own home page that has various categories of content. The categories and types of home pages will be described below. The home page provides a listing of on-demand content for the particular subscriber.

The home page may be formed in various configurations including a menu structure. The content providers may also provide various metadata for the menu structure or program guide.

Another area of the content processing system 102 is an input server 212 that receives the various content and converts the format in a format conversion system 214. A house format asset storage server 216 may be used to store the content asset in a house format. Still image files, trailers, and other information may also be stored in the house format asset storage server. A workflow management system 220 is used to control the format conversion system 214 and the server 212. Also, the workflow management system 220 is coupled to the house format asset storage server 216 and performs ingest control. The house format asset storage server 216 provides still images to a content management system 221 and house format file, video and audio files to the video transport processing system 223.

The VTPS 223 may encode the packet. The encoder may encode the data according to the CableLabs® Video-on-Demand (VoD) encoding specification MD-SP-VOD-CEP-I01-040107 (i.e., performs asset encoding). The encoded data is then packetized into a stream of data packets by a packetizer 270 that also attaches a header to each data packet to facilitate identification of the contents of the data packet such as, for example, a sequence number that identifies each data packet's location within the stream of data packets (i.e., a bitstream). The header also includes a program identifier (PID) (e.g., a service channel identifier (SCID)) that identifies the program to which the data packet belongs.

The stream of data packets (i.e., a bitstream) is then broadcast encrypted by, for example, the well-known Advanced Encryption Standard (AES) or the well-known Data Encryption Standard (DES). In an example, only the payload portion of the data packets are encrypted thereby allowing a user device 110 to filter, route and/or sort received broadcast encrypted data packets without having to first decrypt the encrypted data packets.

The content management system 221 generally controls the overall movement and distribution of contents through the content processing system 102. The content management 221 may also assign material identifications to the various received content. The material identification may utilize the asset identifier (ID) in the metadata as well as the provider ID. Content, posters and other received information may be assigned related material identifications to make them easier to associate and retrieve. For example, different suffixes may be used to identify related content with the remainder of the material identification being the same.

A licensing and contract information 222 and ads from ad sales 224 may be provided to the content management system 221. That is, licensing information, tier assignments, pricing and availability may be provided to the content management system. Asset information, file names and durations may be exchanged between the content management system 221 and the workflow management system 220. The asset information, such as file names and durations, may be determined at the server 212 that is coupled to the workflow management system 220.

A traffic and scheduling system 228 is used to provide the requested channel, program associated data (PAD), channel information and program information packets (PIPs). The traffic and scheduling system 228 may schedule content processing for a plurality of received assets based on a desired program lineup to be offered by the communication system 100. This may include both on-demand programming and linear programming 286. For example, a live TV program for which a high demand for reruns might be expected could be assigned a high priority for content processing. The linear programming 786 provides live broadcasts through the satellite.

A schedule PAD server (SPS) 230 may be coupled to the workflow system and is used to generate a broadband video PAD that is communicated to a conditional access system for broadband video 232. The conditional access system for broadband video 232 may be used to generate control words and control word packet in pairs and provide those to the video transport processing system 223.

In the illustrated example of FIG. 2, users of the user devices 110 are charged for subscription services and/or asset downloads (e.g., PPV TV) and, thus, the content processing system 102 includes a billing system 234 to track and/or bill subscribers for services provided by the system 100. For example, the billing system 234 records that a user has been authorized to download a movie and once the movie has been successfully downloaded the user is billed for the movie. Alternatively, the user may not be billed unless the movie has been viewed.

A billing system 234 receives pricing and availability information from the content management system 221. A conditional access system 236 receives callback information from the communication network 132. The conditional access system may be used to generate authorizations, pay-per-view billing data, and callback data from the billing system 234. Record requests may also be provided from the conditional access transaction system 238. A conditional access system broadcast control center (BCC) 240 may be used to generate a conditional access packet from the information from the conditional access system 236.

The billing system 234 may generate purchase data that is provided to the enterprise integration (EI) block 242. The enterprise integration block 242 may generate record requests to the conditional access transaction system 238. Record requests may be generated through a web interface such as DIRECTV.com® in block 244. Various ordering information, such as ordering broadband (on-demand) video, pay-per-view, and various services may be received at the web interface 244. Various trailers may also be accessed by the users through the web interface 244 provided from the house format asset storage server 216. Enterprise integration block 242 may also receive guide information and metadata from the content management system 221.

Titles, description, various categories and metadata from the content management system 221 may be provided to the advanced program guide system 248. The program guide system 248 may be coupled to a satellite broadcasting system such as a broadcast transport processing system 250 that broadcasts linear, on-demand content and guide data to the users through the satellite 106, 108.

The program guide data generated by the program guide system 248 may include data signals that are communicated to a user device and is used to generate a display of guide information to the user, wherein the program guide may be a grid guide and informs the user of particular programs that are broadcast on particular channels at particular times. A program guide may also include information that a user device uses to assemble programming for display to a user. For example, the program guide may be used to tune to a channel on which a particular program is offered. The program guide may also contain information for tuning, demodulating, demultiplexing, decrypting, depacketizing, or decoding selected programs.

Titles, descriptions and categories may also be provided from the content management system 221 to the content distribution system 260. Content files and metadata may be controlled by the content distribution system 260. Various types of data objects may be used to communicate the program guide content to the user devices. For example, a program object may be used to communicate data that may include, but is not limited to, category, title, rating, description, name, credit, related shows, pay-per-view price, studio, and the like. A channel object may communicate to infrequency, category rating, network, channel name and number. A schedule object may schedule a 24-hour block bridge between the channel and the program. A video-on-demand object may also be provided and provide the list of content and data to be displayed in the video-on-demand categories. These categories and the contents of the categories will be further described below.

The video transport processing system 223 may includes a transport packaging system 270. The transport packaging system 270 creates pre-packetized unencrypted files that are stored in the content repository 274. An encryption module 272 receives the output of the transport packaging system and encrypts the packets. Fully packaged and encrypted files may also be stored in the content repository 274. Encryption may take place in the data portion of a packet and not the header portion.

One or more content delivery networks 280*a-n* may be used to provide content files such as encrypted or unencrypted and packetized files to the communication network 132 for distribution to the user devices 110, 112. The content distribution system 260 may make requests for delivery of the various content files and assets through the communication network 132. The content distribution system 260 also generates satellite requests and broadcasts various content and assets through the broadcast transport processing system 250.

The communication network 132 may be the Internet 122 which is a multiple-point-to-multiple-point communication network. However, persons of ordinary skill in the art will appreciate that point-to-point communications may also be provided through the communication network 132. For example, downloads of a particular content file from a content delivery network may be communicated to a particular user device. Such file transfers and/or file transfer protocols are widely recognized as point-to-point communications or point-to-point communication signals and/or create point-to-point communication paths, even if transported via a multi-point-to-multi-point communication network such as the Internet. It will be further recognized that the communication network 132 may be used to implement any variety of broadcast system where a broadcast transmitter may transmit any variety of data or data packets to any number of or a variety of clients or receivers simultaneously. Moreover, the communication network 132 may be used to simultaneously provide broadcast and point-to-point communications and/or point-to-point communication signals from a number of broadcast transmitters or content delivery networks 280.

The content delivery network 280 may be implemented using a variety of techniques or devices. For instance, a plurality of Linux-based servers with fiber optic connections may be used. Each of the content delivery networks 280 may include servers that are connected to the Internet or the communication network 132. This allows the user devices to download information or content (example, a movie) from the content delivery network 280. The content delivery network 280 may act as a cache for the information provided from the content repository 274. A particular user device may be directed to a particular content delivery network 280 depending on the specific content to be retrieved. An Internet uniform resource locator (URL) may be assigned to a movie or other content. Further, should one of the delivery networks 280 have heavy traffic, the content delivery network may be changed to provide faster service. In the interest of clarity and ease of understanding, throughout this disclosure reference will be made to delivering, downloading, transferring and/or receiving information, video, data, etc. by way of the content delivery network 280. However, persons of ordinary skill in the art will readily appreciate that information is actually delivered, downloaded, transferred, or received by one of the Internet-based servers in or associated with the content delivery network 280.

The content delivery network 280 may be operated by an external vendor. That is, the operator of the content delivery network 280 may not be the same as the operator of the remaining portions of the content processing system 102. To download files from the content delivery network 280, user devices 110, 112 may implement an Internet protocol stack with a defined application layer and possibly a download application provided by a content delivery network provider. In the illustrated example, file transfers are implemented using standard Internet protocols (file transfer protocol FTP), hypertext transfer protocol (HTTP), etc. Each file received by the user device may be checked for completeness and integrity and if a file is not intact, missing, and/or damaged portions of the files may be delivered or downloaded again. Alternatively, the entire file may be purged from the IRD and delivered or downloaded again.

Security of assets available by way of the content delivery network may also be established. Control word packets for each broadcast-encrypted asset or content file may be provided to the content delivery network. Encryption may also be provided.

The broadcast transport processing system 250 may provide various functions, including encoding, packetizing, encrypting, multiplexing and modulating, and uplink frequency conversion. RF amplification may also be provided in the broadcast transport processing system 250.

Wireless delivery via the satellites 106, 108 may simultaneously include both files (e.g., movies, pre-recorded TV shows, games, software updates, program guide information or assets asset files, menus structures etc.) and/or live (linear) content, data, programs and/or information. Wireless delivery via the satellites 106, 108 offers the opportunity to deliver, for example, a number of titles (e.g., movies, pre-recorded TV shows, etc.) to virtually any number of customers with a single broadcast. However, because of the limited channel capacity of the satellites 106, 108, the number of titles (i.e., assets) that can be provided during a particular time period is restricted.

In contrast, Internet-based delivery via the CDN 280 can support a large number of titles, each of which may have a narrower target audience. Further, Internet-based delivery is point-to-point (e.g., from an Internet-based content server to a user device 110, 112) thereby allowing each user of the user device 110, 112 to individually select titles. Allocation of a title to satellite and/or Internet-based delivery or content depends upon a target audience size and may be adjusted over time. For instance, a title having high demand (i.e., large initial audience) may initially be broadcast via the satellites 106, 108, then, over time, the title may be made available for download via the CDN 280 when the size of the target audience or the demand for the title is smaller. A title may simultaneously be broadcast via the satellites 106, 108 and be made available for download from the CDN 280 via the communication network 132.

In the example communication system 100, each asset (e.g., program, title, content, game, TV program, etc.) is pre-packetized and, optionally, pre-encrypted and then stored as a data file (i.e., an asset file). Subsequently, the asset file may be broadcast via the satellites 106, 108 and/or sent to the CDN 280 for download via the CDN 280 (i.e., Internet-based delivery). In particular, if the data file is broadcast via the satellites 106, 108, the data file forms at least one payload of a resultant satellite signal. Likewise, if the data file is available for download via the CDN 280, the data file forms at least one payload of a resultant Internet signal.

It will be readily apparent to persons of ordinary skill in the art that even though the at least one payload of a resultant signal includes the data file regardless of broadcast technique (e.g., satellite or Internet), how the file is physically transmitted may differ. In particular, transmission of data via a transmission medium (e.g., satellite, Internet, etc.) comprises operations that are: (a) transmission medium independent and b) transmission medium dependent. For example, transmission protocols (e.g., transmission control protocol/Internet protocol (TCP/IP), user datagram protocol (UDP), encapsulation, etc.) and/or modulation techniques (e.g., quadrature amplitude modulation (QAM), forward error correction (FEC), etc.) used to transmit a file via Internet signals (e.g., over the Internet 122) may differ from those used via satellite (e.g., the satellites 106, 108). In other words, transmission protocols and/or modulation techniques are specific to physical communication paths, that is, they are dependent upon the physical media and/or transmission medium used to communicate the data. However, the content (e.g., a file representing a title) transported by any given transmission protocol and/or modulation is agnostic of the transmission protocol and/or modulation, that is, the content is transmission medium independent.

The same pre-packetized and, optionally, pre-encrypted, content data file that is broadcast via satellite may be available for download via Internet, and how the asset is stored, decoded and/or played back by the user devices 110 is independent of whether the program was received by the user devices 110 via satellite or Internet. Further, because the example content processing system 102 of FIG. 1 broadcasts a live program and a non-live program (e.g., a movie) by applying the same encoding, packetization, encryption, etc., how a program (live or non-live) is stored, decoded and/or played back by the user devices 110 is also independent of whether the program is live or not. Thus, user devices 110, 112 may handle the processing of content, programs and/or titles independent of the source(s) and/or type(s) of the content, programs and/or titles. In particular, example delivery configurations and signal processing for the example content delivery system of FIG. 2 are discussed in detail below.

A content data collector 290 may also be associated with the content processing system 102. The content data collector 290 may be a separate resource or be included within the content processing system 102. The content data collector 290 may be used to collect various types of data about content from an external website or websites 292. The external website 292 is an external source of data that is provided to the content data collector 290. The content data collector 290 may search for content on an external website 292 about various content titles, actors within the content titles, descriptions, filmography and content related to the content titles. In the present example, the external websites may be entertainment websites, sports websites, or various other types of websites. By way of example, the content data collector 290 may search for various terms such as content titles, actors, or other data. The external websites 292 may also provide information as to predicted ratings for various programming. One example of a website for data is Tribune Media Services (TMS) ON® service. The content data collector 290 may be in communication with the program guide module 248 which communicates the program guide content as well as other data to the various user devices.

Figure 3:
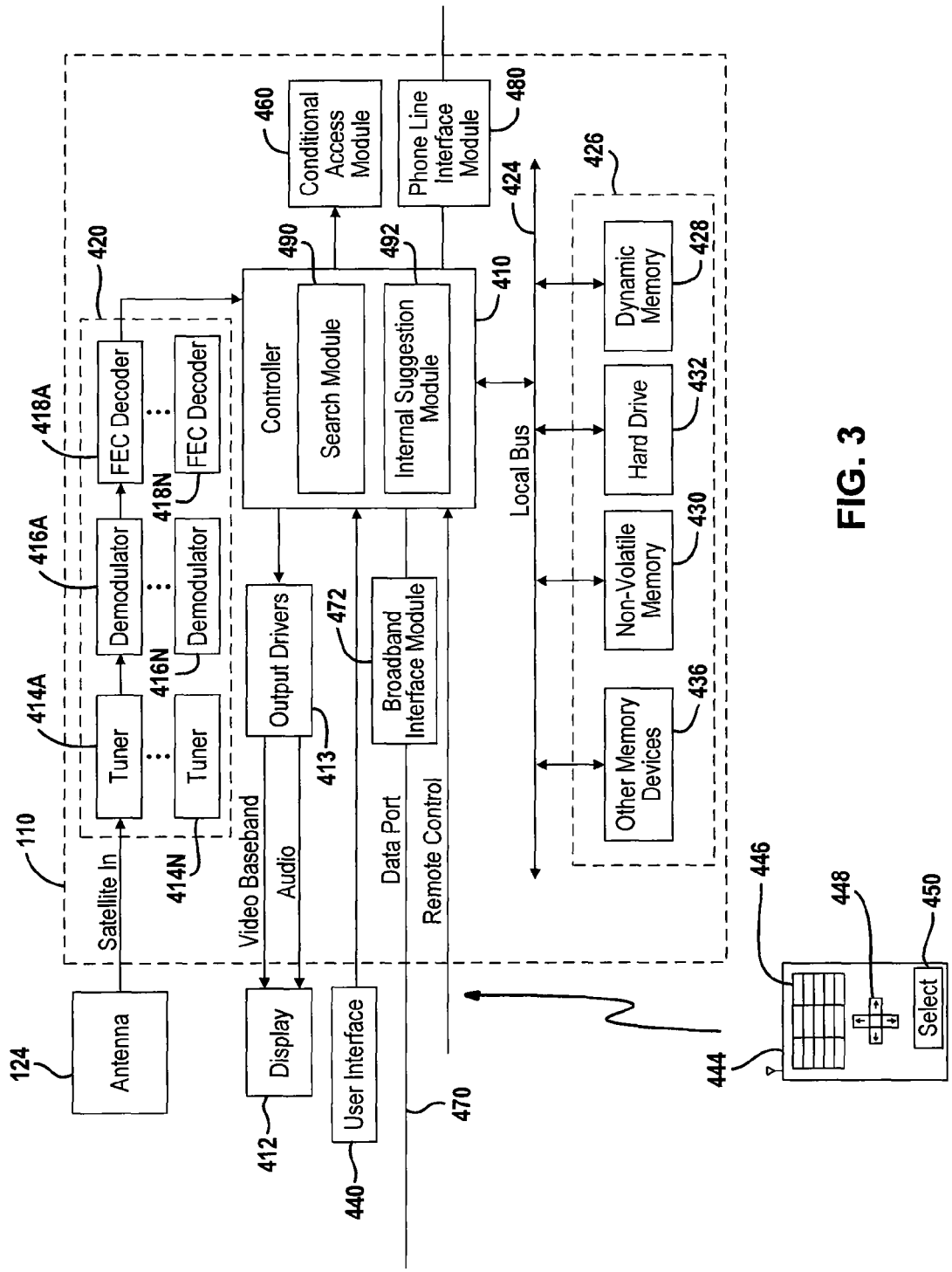
FIG. 3 is a detailed block diagrammatic view of the user device of FIG. 1.

Referring now to FIG. 3, a user device 110 such as a fixed user device is illustrated. A similar configuration for a mobile user device may also be used. The fixed user device may include a fixed antenna. If the user device is a mobile user device, the antenna 124 may be a rotating antenna that is used to track the relative movement of the satellite or an omni-directional antenna that may receive antenna signals from various directions.

The user device 110 may include a controller 410. The controller 410 may control various operations as will be described below. The user device 110 may be in communication with a display 412 through output drivers 413. The output drivers 413 may generate desired audio and video output formats suitable for the particular display 412.

The controller 410 may be a general processor such as a microprocessor. The controller 410 may be used to coordinate the control and the functions of the user device. These functions may include the functions of a receiving circuit 420. The receiving circuit 420 may include a tuner 414, a demodulator 416, a forward error correction decoder 418 and any buffers or other functions. More than one tuner, demodulator and FEC decoder may be provided as indicated by the reference numerals "A" and "N". One constructed embodiment may include four tuners, demodulators and decoders, although various numbers of tuners, demodulators and decoders may be provided depending upon the system requirements. The tuner 414 receives the signal or data from the broadcast channel. The signal may include programming content or different types of data including program guide data. The demodulator 416 demodulates the signal to form a demodulated signal or demodulated data. The decoder 418 decodes the demodulated signal to form a decoded data or decoded signal.

The controller 410 may also be coupled to a local bus 424. The local bus 424 may be used to couple a memory 426, including a dynamic memory 428, such as random access memory (RAM) which changes often and whose contents may be lost upon the interruption of power or boot up. The bus 424 may also be coupled to a non-volatile memory 430. One example of a non-volatile memory is an electrically erasable programmable read only memory (EEPROM). One specific type of EEPROM is flash memory. Flash memory is suitable since it is sectored into blocks of data that may be individually erased and rewritten.

A hard drive 432 may also be in communication with the local bus 424. The hard drive 432 may act as a digital video recorder for storing video and storing various data and various content. The various data stored may include metadata such as titles, actors, directors, descriptions, posters, identifiers, availability start times, availability end times, pricing data, timing data, program guide data, internal data regarding tuning, search recording and watching recorded content and various other types of data. The hard drive may also be interchangeable with another memory device with a large capacity.

Other memory devices 436 may also be coupled to the local bus 426. The other memory devices may include other types of dynamic memory, non-volatile memory, or may include removable memory devices. The display 412 may be changed under the controller 410 in response to data in the dynamic memory 428 or non-volatile memory 430.

The controller 410 may also be coupled to a user interface 440. The user interface 440 may be various types of user interfaces such as a keyboard, push buttons, a touch screen, a voice activated interface, or the like. The user interface 440 may be used to select a channel, select various information, change the volume, change the display appearance, or other functions. The user interface 440 may be used in addition to a remote control device 444. The remote control device 444 may include a keypad 446, an arrow keypad 448, and a select button 450. Inputs to the user device may be provided by the remote control device or through the user interface 440.

A conditional access module card 460 (CAM) may also be incorporated into the user device. Access cards, such as a conditional access module, may be found in DIRECTV® units. The access card 460 may provide conditional access to various channels and wireless signals generated by the system. The access card 460 may control the decryption of program content. Not having an access card or not having an up-to-date access card 460 may prevent the user from receiving or displaying various video and other content from the system.

The controller 410 may also be in communication with a data port 470. The data port 470 may be a broadband data port that is coupled to the controller 410 through a broadband interface module 472. The broadband interface module 472 may allow wireless or wired communication between external devices with the controller 410. The controller 410 through the broadband interface module 472 may communicate with the internet and various systems such as the head end of the content communication system. Callback signals may be provided through the broadband interface module 472 from the controller 410.

The controller 410 may also be in communication with a phone link interface module 480. The phone link interface module 480 may couple the user device 110 to a public switched telephone network (PSTN). The user device 110 may generate callback signals to the head end through the phone interface module 480.

Callback signals are provided through the broadband interface module 472 and the phone interface module 480.

The controller 410 may include a search module 490. The search module, as will be further described below, is used for performing various functions including generating search screens to be displayed on the display 412, compiling data from the received signals, and sorting of content listing data based upon inputs provided from a user interface 440 or the remote control 444.

The controller 410 may also include an internal suggestion module 492. The internal suggestion module 492 may be a separate module or be incorporated into the search module. The internal suggestion module 492 may provide data to modify content listings based upon how the user acts. For example, data relative to content watched, content recorded or content recorded and watched may be used to generate weights for modifying content lists of suggestions. Suggested data may be provided in the search results. The suggested data may be stored in suggestion data objects in the user device memory and are searched first before other data objects in the user device memory.

Figure 4:
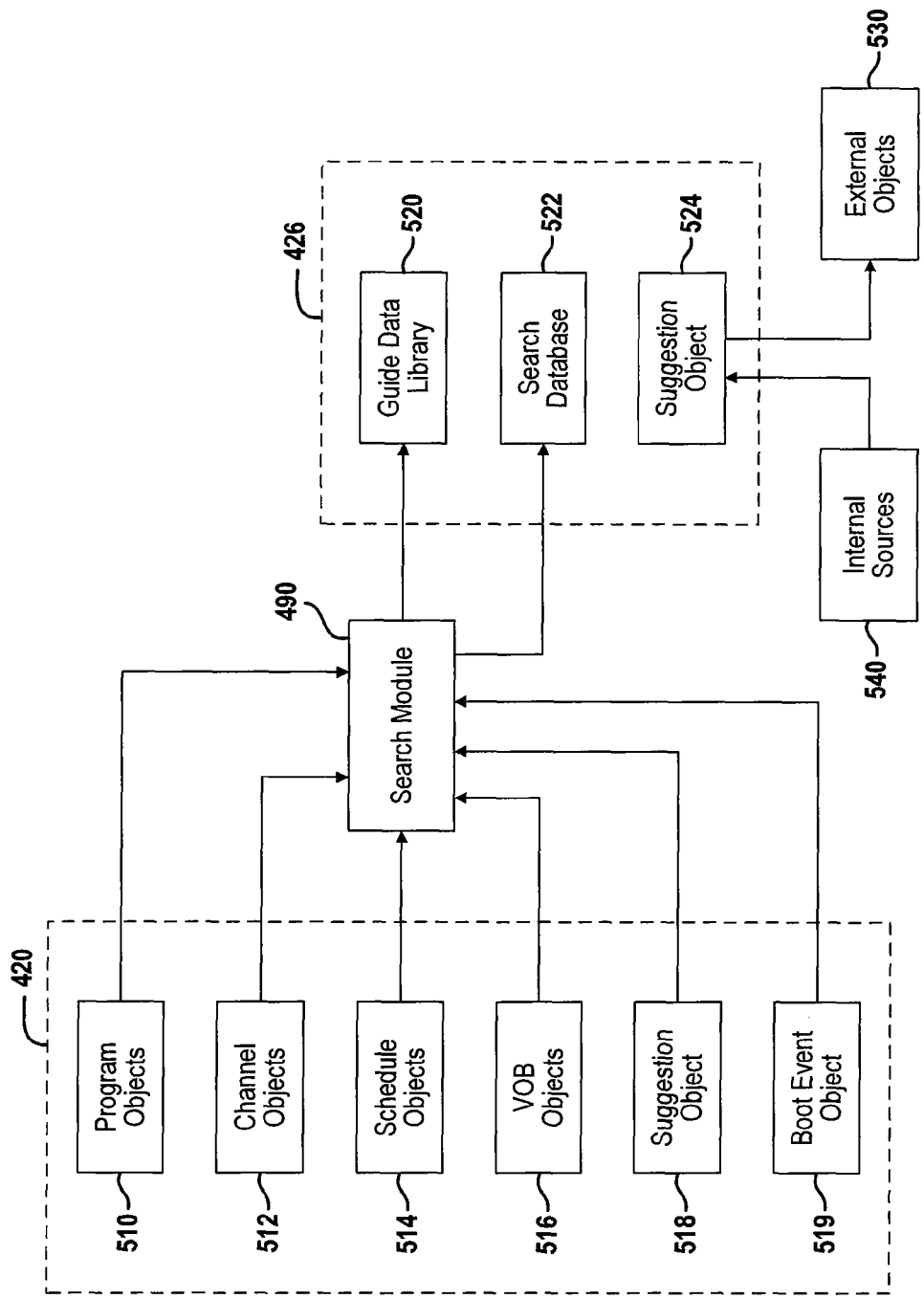
FIG. 4 is a block diagrammatic view of the search module 490 in relation to the receiver 420 and the memory.

Referring now to FIG. 4, a high-level block diagrammatic view of the search module 490 in relation to the receiving circuit 420 and the memory 426 is shown. The search module 490 may receive various data objects that include program objects 510, channel objects 512, schedule objects 514, and video-on-demand objects 516. The various objects may be used for communicating different types of data to form the program guide library 520, the search database 522, and the suggestion objects 524. The program objects may be received and parsed by the search module 490. The search module 490 may be used for providing various types of program data including, but not limited to, names, titles, categories, and episode titles.

The channel objects 512 may be used for conveying the channel name and number, as well as the name descriptor.

The schedule objects may be a bridge between the channel objects and the program object. The schedule objects may provide a 24-hour schedule block for the channels.

The video-on-demand objects may provide various types of information regarding video-on-demand content, content titles, and a schedule.

In addition to the above objects, various other objects such as a suggestion object 518 may also be received by the system. It should be noted that the various objects may be parsed so that the different types of data, as well as the kind of data, may be stored within the search database 522. Appropriate data is also stored in the guide library 520. Suggestion objects 518 may be included within the search database 522 or may be kept separate as illustrated in FIG. 4. By keeping the suggestion objects separate, the suggestion objects may be easily replaced on a more frequent basis than the other objects. Each of the objects 510-518 may include an object identifier and the data saved may also include the object identifier. During broadcasting, objects are continually added and removed from the guide library in the search database. The object identifier makes easy removal of the objects from the search database.

The search module 490 may also receive additional data such as a content identifier and category information, icon information, major-minor channel numbers, the high definition, video-on-demand data, and adult classification.

During an initial boot-up, with no prior guide data, the guide data may be obtained from a boot event object 519. During the initial boot-up period, initial content data from the boot event may not be shown in the search results.

The suggestion objects 524 may be obtained from external sources 530 and internal sources 540. The external sources may include various websites, manual inputs at the content processing system by a system operator and other types of sources external to the content processing system. Internal sources 540 refers to sources within the set top box which may include, but not be limited to, purchase, search and record data as will be described below.

Figure 5:
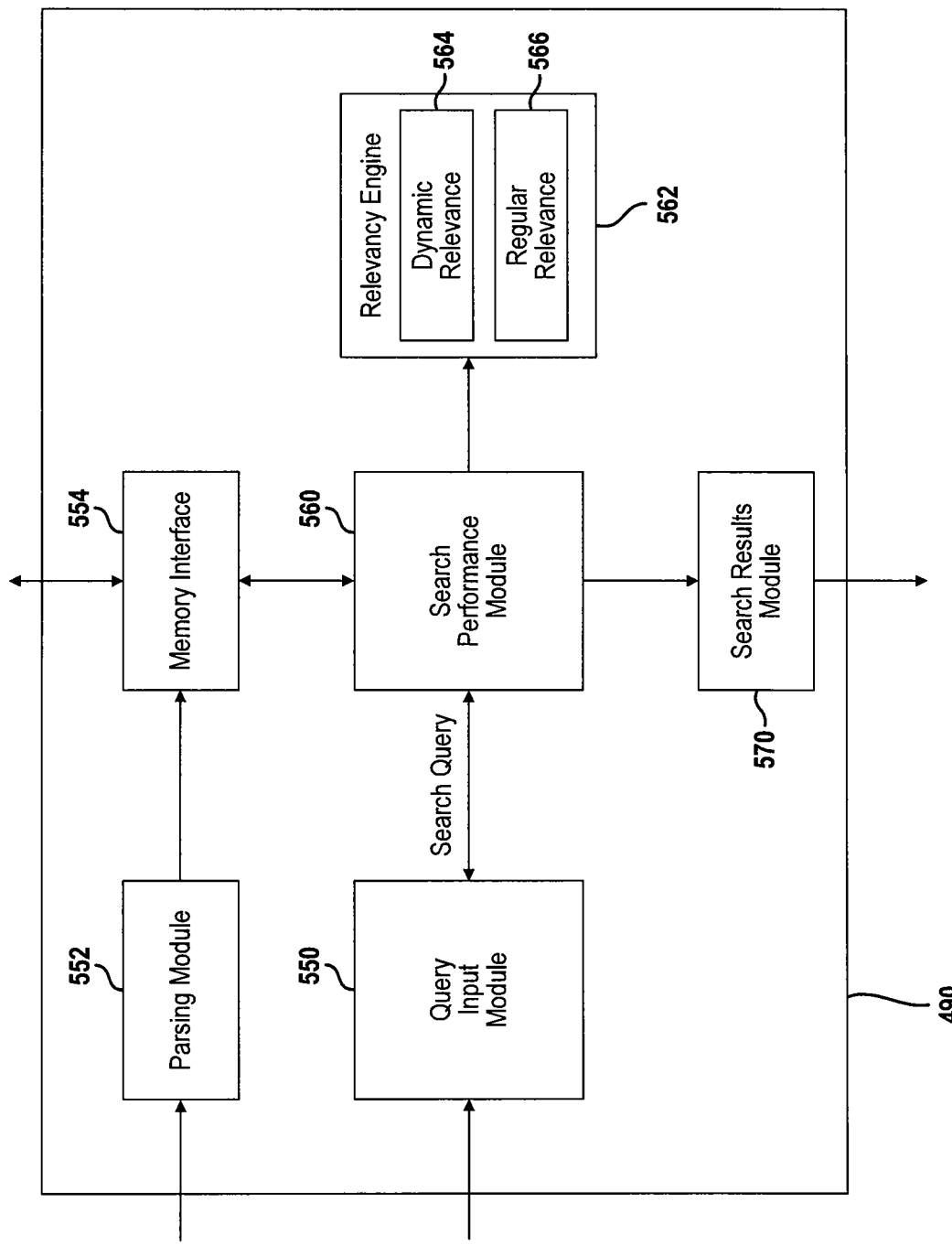
FIG. 5 is a block diagrammatic view of the search module.

Referring now to FIG. 5, the search module 490 is illustrated in further detail. The search module 490 may include a query input module 550 that receives input from the user interface or the remote control. The query input module receives alphabetic or numeric characters that are used for searching. The characters may be input by selecting keypad screen display inputs as will be further illustrated below or by direct input using buttons on the user device. A parsing module 552 may receive various data objects and parse the objects and store the parsed objects in the memory 426 illustrated in FIGS. 3 and 4. The parsing module 552 may thus be in communication with a memory interface module 554 that stores data and retrieves data from the memory 426. The parsing module 52 may be used for removing objects from the memory 426. The memory 426 may be used for storing data available for the searches (search data).

The search performance module 560 is used for generating search results based upon the search data stored in the memory. The search performance module 560 is in communication with the query input module 550. The query input module 550 inputs a search query to the search performance module 560 which then obtains search results which may be in the form of a list from the memory. The performance of a search may be initiated at the input of a first character. The search results may be modified as other characters are entered.

A relevancy engine 562 may include a dynamic relevance module 564 and a regular relevance module 566. The regular relevance module 566 may determine the regular relevance of the character strings retrieved in the search. As will be described below, the dynamic relevance module 564 may be used to alter or over-ride the regular relevance from the regular relevance module. The dynamic relevance may change based upon various types of input. Many types of input may be used to change the dynamic relevance including, but not limited to, the location of the user device, the search history, the customer purchase patterns, the market popularity of various data, the viewing history, and the recording history. The relevancy data may be stored in data objects called suggestion data objects. The suggestion data objects may be stored in a memory and accessed through a memory interface 554. The memory may be random access memory (RAM). RAM may allow relatively quick access to the suggestion objects.

The search performance module 560 may modify the list obtained by searching the results in response to the relevance provided by the relevancy engine 562. The results list may be stored in the memory of the user device. The search results module 570 may receive the search results and modify the search results before displaying the search results on a display. The search results module 570 may also apply various other rules, including prioritization by the type of content corresponding to the search results, alphabetizing the search results list, and providing other rules for modifying the search results and the display of the search results as described below. For example, suggestion objects may be searched prior to other objects so the results appear quickly.

Figure 6:
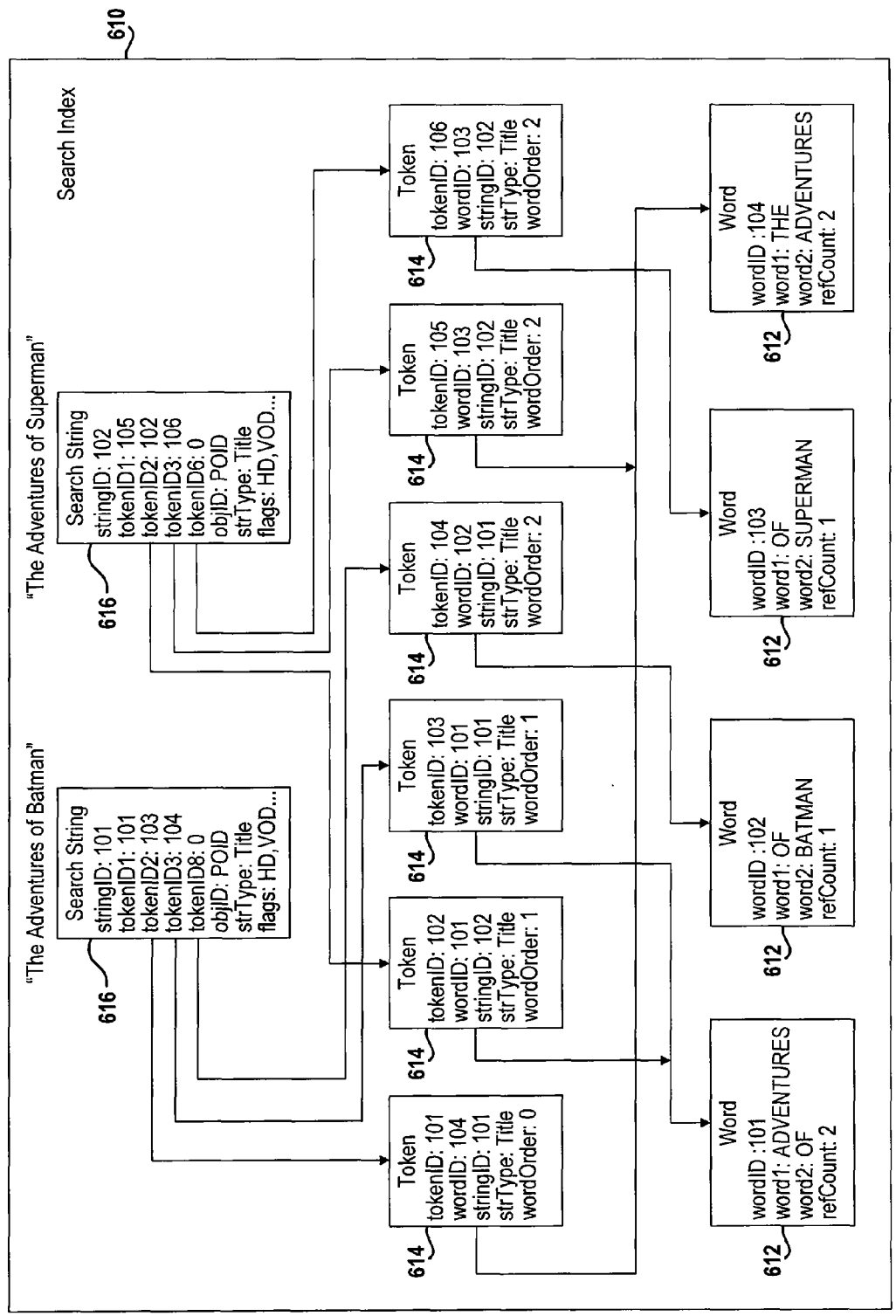
FIG. 6 is a block diagrammatic representation of a search index according to the present disclosure.

Referring now to FIG. 6, the parsing module 552 may parse the receive strings into a data structure suitable for searching. The parsing module 552 may be used to tokenize the search data and provide inter-relationships between the various search data in a database-like manner. The parsing module 552 is used to break down strings into individual token objects and word objects. The individual string objects are received from the program guide data. Various rules may be followed by the parsing module in order to provide the various strings. For example, common symbols such as punctuation symbols, bracket symbols, and the like may be ignored if desired. Various foreign or other accentuated characters may be replaced with similar characters. Further, all letters may be converted to upper-case letters during the process. The search data, along with the inter-relationships of the search data, may be referred to as a search index 610.

A plurality of word objects 612 may be included within the search index 610. Each word object may include various data, including a word identifier (wordID), a first word (word1), a second word (word2), and a reference count (refCount). It should be noted that a whole word may be stored within the word identifiers. However, to limit space only the first 16 letters of a search word may be used. As mentioned above, the characters may also be converted to upper-case letters so that the system is insensitive to case-matching. The word identifier is a unique word identifier that is used to be referenced by other objects within the search index 610. The word object stores a first word and a second word. The first word is the first word of a string and the second word is the word immediately following the first word. Alphabetizing of the words is performed using the first word as well as the order of the following word. This reduces the overall complexity and increases the speed of the searching. By entering the space between the first word and the second word, searching on a single word allows the words to be found easily but, to determine the correct word order, the following word is used.

The word object may also include other identifiers, such as an overflow flag which indicates that the word is more than 16 letters long. Other flags for other purposes may also be included, depending upon the requirements of the system. In the illustrated example, the first token is provided a word identifier of 101, a first word of ADVENTURES and a second word corresponding to OF. The reference count signifies the number of references to the word ADVENTURES. Token objects 614 may also be included within the search index 610. Each token object 614 is assigned a unique token identifier (tokenID). The token identifier is unique for each token. The token object 614 may also include a word identifier that identifies the word identifier for the token. Each token may also include a string identifier (stringID) that links to the complete string as will be described below. Each token object 614 may also include a string type that provides the type of string such as movie, show, person, name first, name last, title, channel, or the like. A word order identifier (wordOrder) may also be provided to provide the position of the word within the complete string. A proximity identifier may also be provided which is used to denote whether an article such as "the," "a," or "an" precedes the word. While each token identifier is unique, the different token identifiers may refer to more than one word as illustrated by the arrows in the figure.

A search string object 616 corresponds to the parsed search terms. The parsed search terms that are parsed as described above, are various phrases and titles, and the like. Each search string object includes a search string identifier. Each search string identifier is unique. The search string objects include token identifiers, such as tokenID1, tokenID2, and tokenID3. Each token identifier refers to the various tokens for building the string. Various numbers of token identifiers may be provided in a search string object. An object identifier may also be included in the search string object. As mentioned above, the various received objects, such as a program object or channel object, may include an identifier. The object identifier identifies the various program object, channel object, or the like from which the search string was received.

A string type (strType) may identify the type of string such as a title string, a movie, a show, a first name, last name, tile, or channel. Various other types of identifiers may be provided such as a sub-type identifier which provides a source of the string, such as a cast member, director, or writer. A relevance identifier may also be used in the search string object. The total number of words in a string (numTokens) may also be provided within the search string.

In the example provided "The Adventures of Batman" is the first search string and "The Adventures of Superman" are the second search string. Three token identifiers 101, 103, and 104 refer to the corresponding tokens for "The Adventures of Batman." The tokens for the first search string object are 101, 103 and 104. Token 101 refers to word identifier 104, token 103 refers to word identifier 101 and token 104 refers to word identifier 102. Thus, the search string objects 616 are formed of various word objects 612 and are linked to the search string objects 616 through the token 614.

Figure 7:
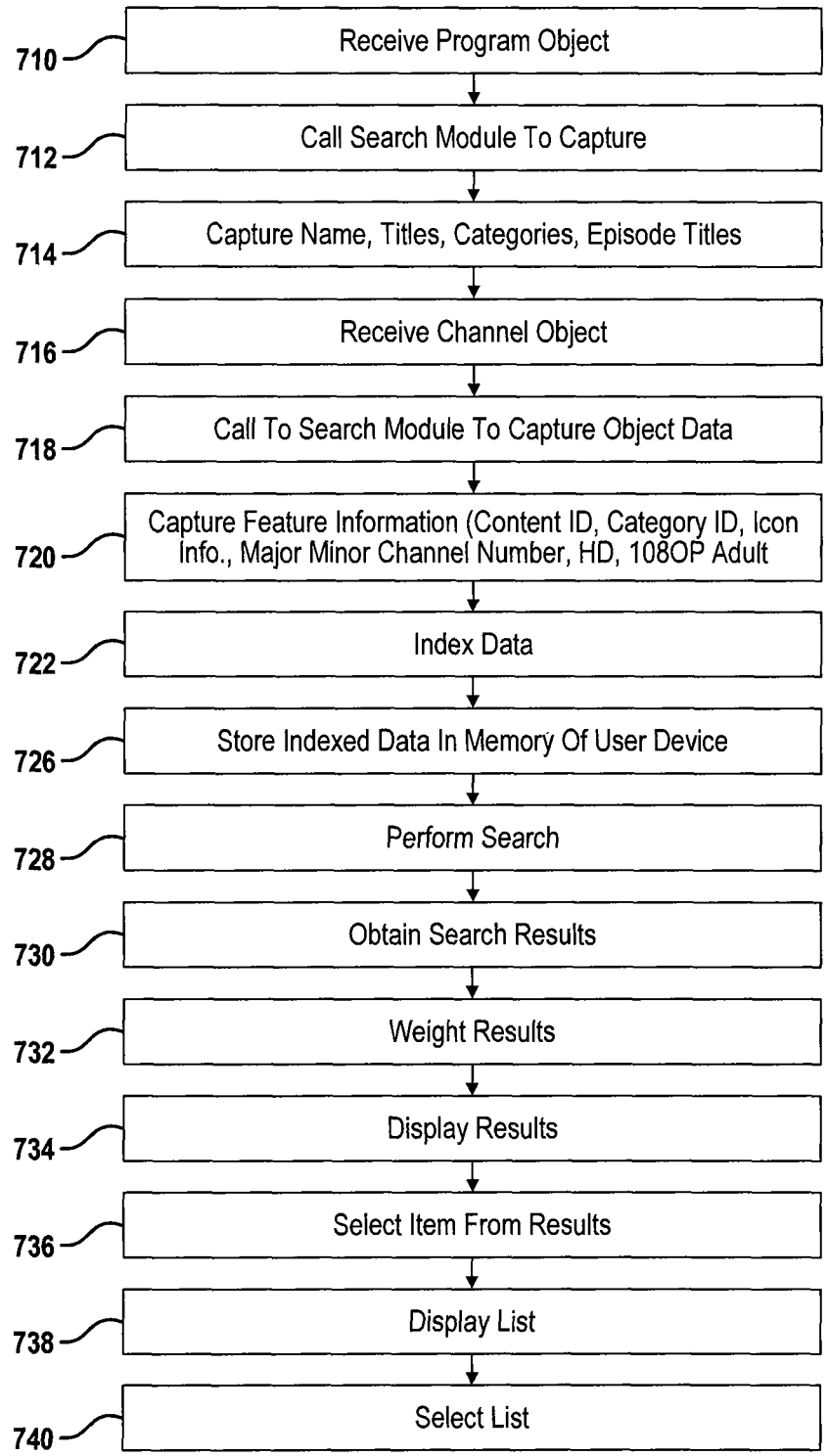
FIG. 7 is a flowchart of a method for processing search data.

Referring now to FIG. 7, a high-level method of performing a search and obtaining the search words is set forth. First, the data used in the search is stored separate from the program guide data from which it is received. In step 710, the various program objects are received. In step 712, calls are provided to direct the search module to capture various names, title, categories, episode titles, and the like that are contained within the program object. In step 714, the data is captured from the program object, such as the name, titles, categories, episode titles, and the like.

In step 716, various channel objects are received. In step 718, a call to the search module to capture the channel names and other channel object name is provided. In step 720, a capture is performed which captures the data within the channel object.

In step 720, various feature data may also be captured, including a content identifier, category identifier, icon information, major and minor channel numbers, a high-definition identifier, a 1080p identifier, and an adult identifier. In step 722, the various data captured from the objects may be indexed as described above in FIG. 6. The indexed data may be indexed into search string objects, token objects, and word objects as described above.

In step 726, the indexed data is stored within a memory of the user device. The indexed data may be stored in a separate memory from the program guide data to facilitate faster searching. In step 728, the search is performed. In step 730, the search results are obtained from the search. The search results may include search results from the indexed search data as described above. In step 732, the search results are weighted. The weighting process and the searching process will be described in further detail below. In step 734, the results are displayed. In response to the displayed results, the users may select items from the results in step 736. Selected items may be selected by buttons on the set top box or buttons on a user interface. Arrows may be used to scroll up and down the search results. In response to selecting an item, further lists may be displayed in step 738. Further lists may display, for example, various times for the content. In step 740, a selection item from the displayed list in step 736 may be displayed. By selecting an item from the list, the content may be directly tuned or prompts may be provided requesting recording of the particular content.

Figure 8:
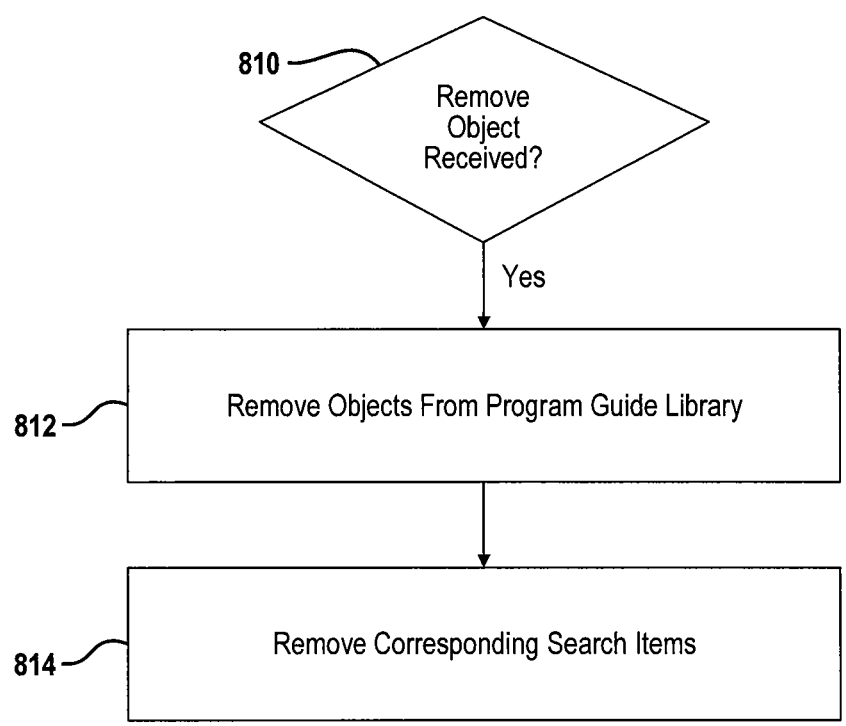
FIG. 8 is a flowchart of a method for removing search data.

Referring now to FIG. 8, a remove object call may also be received by the set top box and the search engine therein. As mentioned above, objects are continually added and removed as time progresses so that the program guide corresponds to current programming as well as a pre-determined amount of programming in the future. When a remove object is received, the object identifier is used to locate the objects and remove the objects from the program guide library in step 812. In step 814, the corresponding search data, including the various objects of FIG. 6, are removed. Because each of the objects includes an identifier, the strings corresponding to the remove object request may be easily found and removed.

Figure 9:
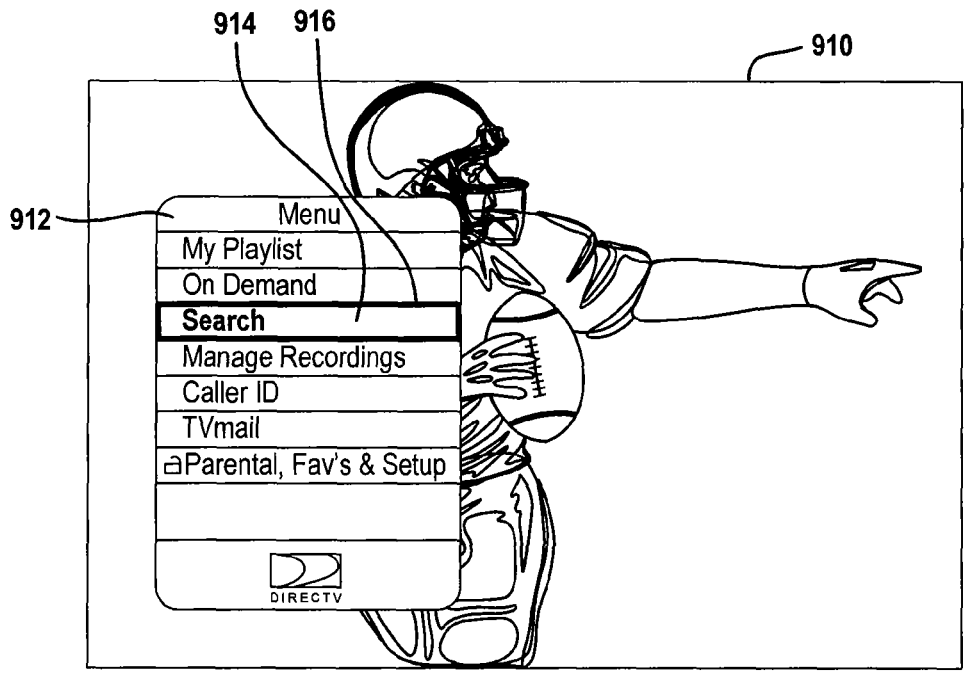
FIG. 9 is a screen display of a method for entering a search.

Referring now to FIG. 9, a screen display 910 is illustrated that includes a menu 912 that may be referred to as a "quick menu." The quick menu as illustrated includes a my playlist entry, an on-demand entry, a search entry, a manage recordings entry, a caller ID entry, and a TV mail entry. The quick menu may be displayed over the currently selected programming. To perform the searching of the present disclosure, the search entry 914 is selected by a selector box 916. Of course, other methods of entering a search may be provided including direct entry with a user interface button, for example.

Figure 10:
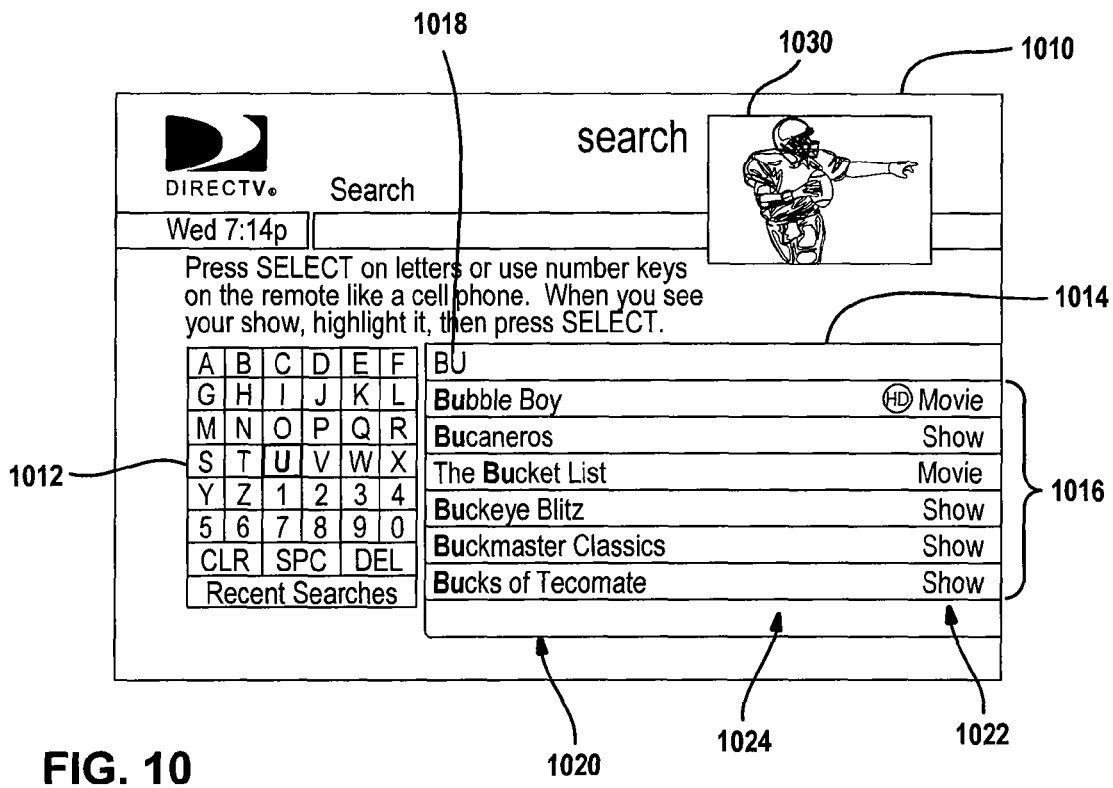
FIG. 10 is a screen display of a method for searching.

Referring now to FIG. 10, after entering a search mode using the user interface, an initial home search screen 1010 may be displayed on the display associated with the user device. The home search screen 1010 may include a keypad 1012 for entering various searches by entering characters. A results panel 1014 may be used to illustrate the search results 1016 in response to the entered text 1018. In this example, "BU" was entered as the entered text 1018. The results panel 1014 may include titles 1020 and content types 1022. As soon as text is entered, the results panel quickly displays the most relevant matches. As displayed, the search results for "B" were quickly replaced by the search results for "BU" upon entry of the "U." A pre-determined number of matches may be provided. Arrow keys 1024 on the user device may be used to scroll through the various matches and select a match. The arrow keys 1024 may be visible or hidden on the display. Portions of the titles 1020 may be highlighted to indicate why the match is displayed. In this example, BU was entered as the entered text 1018 and thus the "BU" of each of the titles 1020 is also highlighted. Highlighting may be performed in various manners, including changing the color of the text or bolding the text in an actual implementation. The content types 1022 may include, but are not limited to, movies, shows, persons, categories, and channels. If a channel is displayed, the major and minor channel numbers may be displayed along with the title of the channel rather than the type.

Icons such as a 1080p icon or high-definition icon may also be displayed within the search results. As mentioned above, the results may also be prioritized by relevancy. The relevancy may be arbitrarily set by the system designers. The relevancy set forth herein is provided by way of example. Prioritization may take place in the order of top match, first word, first word article, channel, category, title, and then persons. In this example, only titles are provided. Display items with a common relevance weight may be provided in alphabetical order within the relevance. Because each of the contents are titles in the example of FIG. 10, the results panel 1014 is alphabetized.

Other rules may also be provided for displaying the search results. For example, if "TOWN" is entered, titles with "TOWN" will be displayed higher than titles with "TOWNSEND" or "TOWNSHIP." That is, complete words may have a higher alphabetic ordering. Also, the displayed search results for three or fewer entered characters may be abbreviated.

The search screen may have a current channel playback screen 1030 provided so that searching can be done while watching the current channel.

Figure 11:
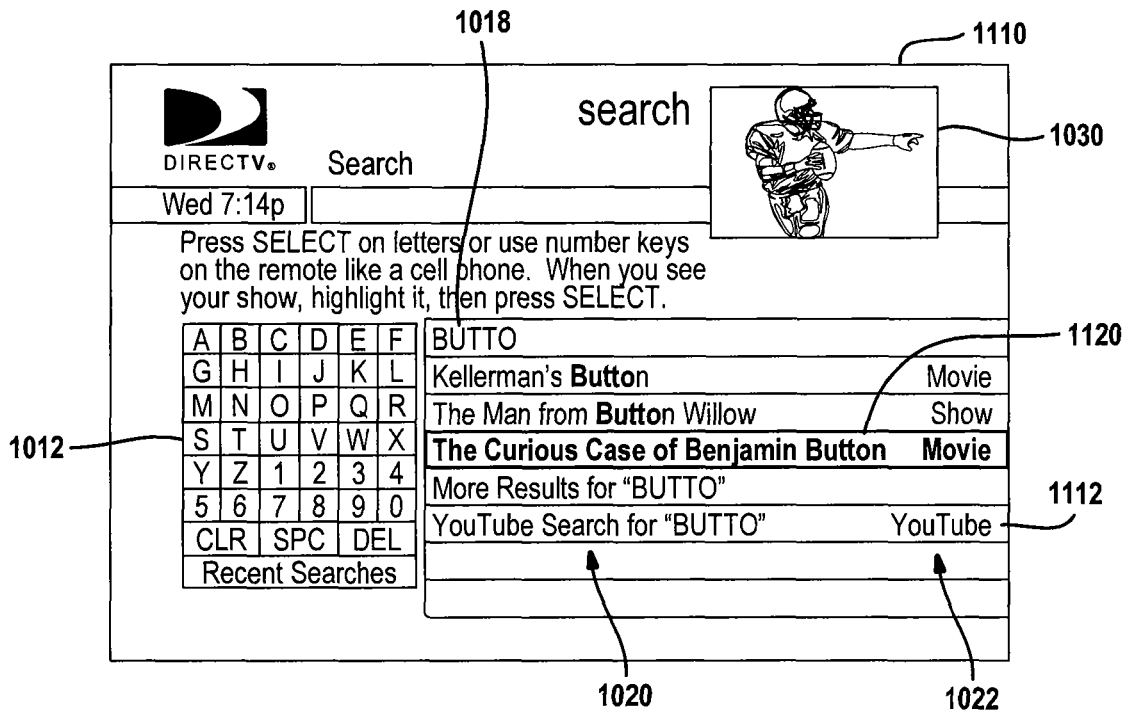
FIG. 11 is a screen display of a method for searching, including more results than FIG. 10.

Referring now to FIG. 11, a screen display 1110 is illustrated. The screen display 1110 illustrates a further example of FIG. 10 in which more entered text 1018 is provided. In this example, "BUTTO" is entered into the entered text area 1018. The search results include various titles. The search results may also link to outside sources such as an Internet source such as "YouTube" in an external search entry. While the external search entry 1112 is illustrated with "YouTube," other video sources may be used. Likewise, other forms of searches at other websites may also be performed.

As illustrated, a selection box 1120 highlights a particular desired search result from the results panel 1014. In this case, "The Curious Case of Benjamin Button" is highlighted. Once the search selection box 1120 is positioned in the desired area, a selection may be made with the user interface.

Figure 12:
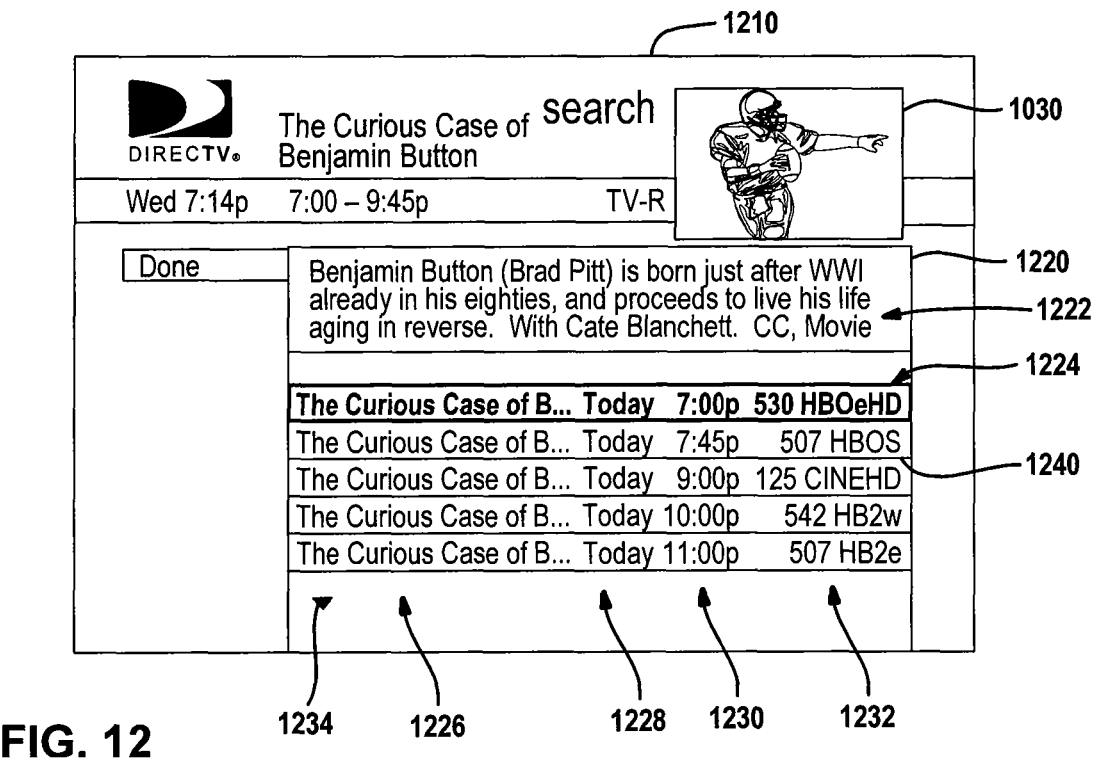
FIG. 12 is a screen display of a method for displaying a selection from the display in FIG. 11.

Referring now to FIG. 12, when a selection is made in FIG. 11 for the particular title, more information about the title may be provided. Another search using the exact match may be performed. In this embodiment, a results panel 1220 is generated. The results panel 1220 may include various results, including a description area 1222 that provides a description of the selected area. Also, a list 1224 of various titles 1226, date 1228, times 1230, and channel 1232, may be displayed. The list 1224 may be scrolled using a scroll control 1234 to scroll down to other search results. The date 1228 may provide the date or an indicator such as today or tomorrow. The times 1230 may display the starting time for the particular title by numerical data or a date descriptor such as today or tomorrow. By positioning the selection box 1240, the title may be tuned or selected for recording on a DVR depending upon the time.

Figure 13:
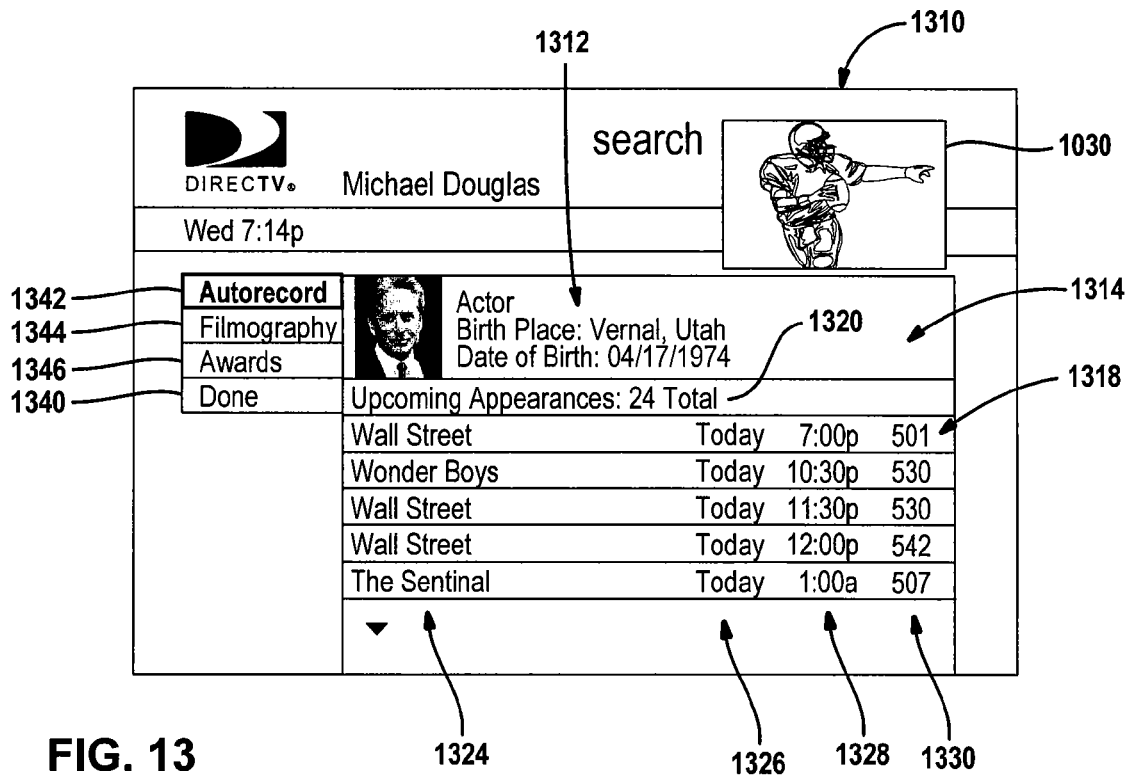
FIG. 13 is a screen display of a method for displaying actor information.

Referring now to FIG. 13, a screen display 1310 is illustrated. In this example, when a list that includes an actor's name is selected, rather than a title in FIG. 12, upcoming appearances of the actor may be illustrated. In this example, a results panel 1312. The results panel may include an actor information portion that displays actor data. Various types of actor data, including the birth place, the date of birth, a picture of the actor, and other actor data may be provided. An upcoming appearances portion 1318 may also be generated. A list of the upcoming titles in which the particular selected actor is featured may be displayed in the upcoming appearances section 1318. A summary portion 1320 may provide a summary of the number of upcoming appearances. The upcoming appearances portion 1318 may include titles 1324, the date 1326, the time 1328, and the channel 1330. A menu 1340 may also be used to provide additional information in the actor information portion 1314. In this example, the auto record portion 1342 is illustrated in the actor information portion 1314. A filmography portion 1344 may provide a list of titles in which the actor stars. An awards portion 1346 may provide various awards achieved by the actor in the actor information portion 1314.

Figure 14:
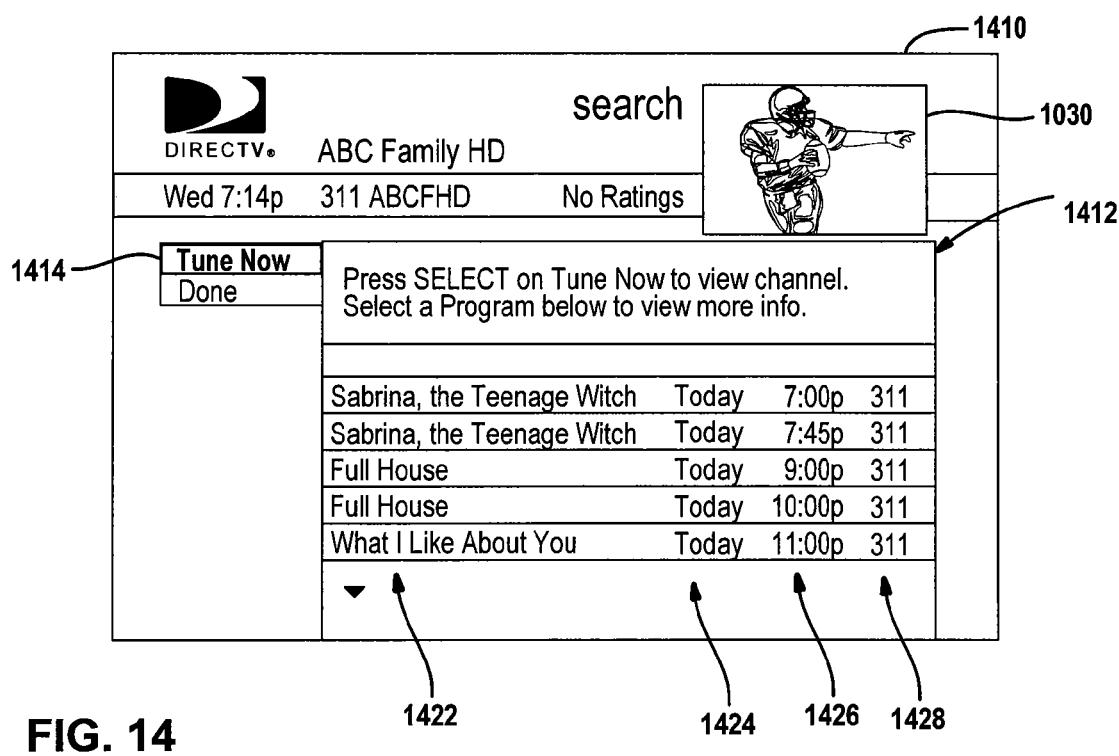
FIG. 14 is a screen display of a method for displaying channel information.

Referring now to FIG. 14, search results for channel results are illustrated in the screen display 1410. The channel results may have been selected from entering the channel name in the search description. By selecting the channel name in a results list, a results panel 1412 provides a list of content available on the particular channel. A tune-now button 1414 may be selected to tune to the current programming on the selected channel. The results panel 1412 may generate titles 1422, the data 1424, the time 1426, and channel number 1428.

Figure 15:
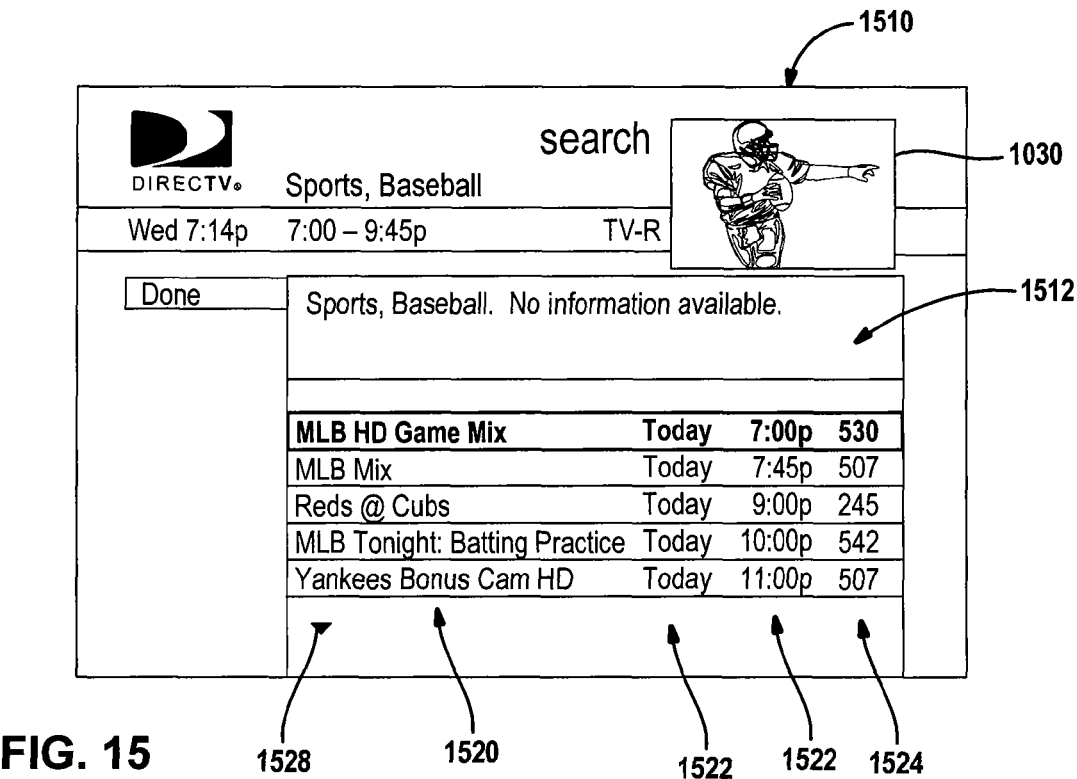
FIG. 15 is a screen display of a method for displaying category information.

Referring now to FIG. 15, a category results screen display 1510 is illustrated. In this example, sports, baseball was selected in a previous results list. In this example, the results panel 1512 includes titles 1520, the date 1522, the time 1524, and the channel 1526. The scroll control 1528 may be used to scroll down to view various other titles.

Various categories of content may be established. The different types of categories include, but are not limited to, movies, such as action/adventure, animation, comedy, documentaries, drama, horror, musicals, mystery/crime, nature, romance, science-fiction, suspense, and western. Various types of sports, including baseball, basketball, may also be categories. Other types of categories include kids, family, talk, art, computers, educational, electronics, fashion/style, health/medicine, history, housing/gardening, how-to, military/war, politics, religion, science, shopping and travel.

Figure 16:
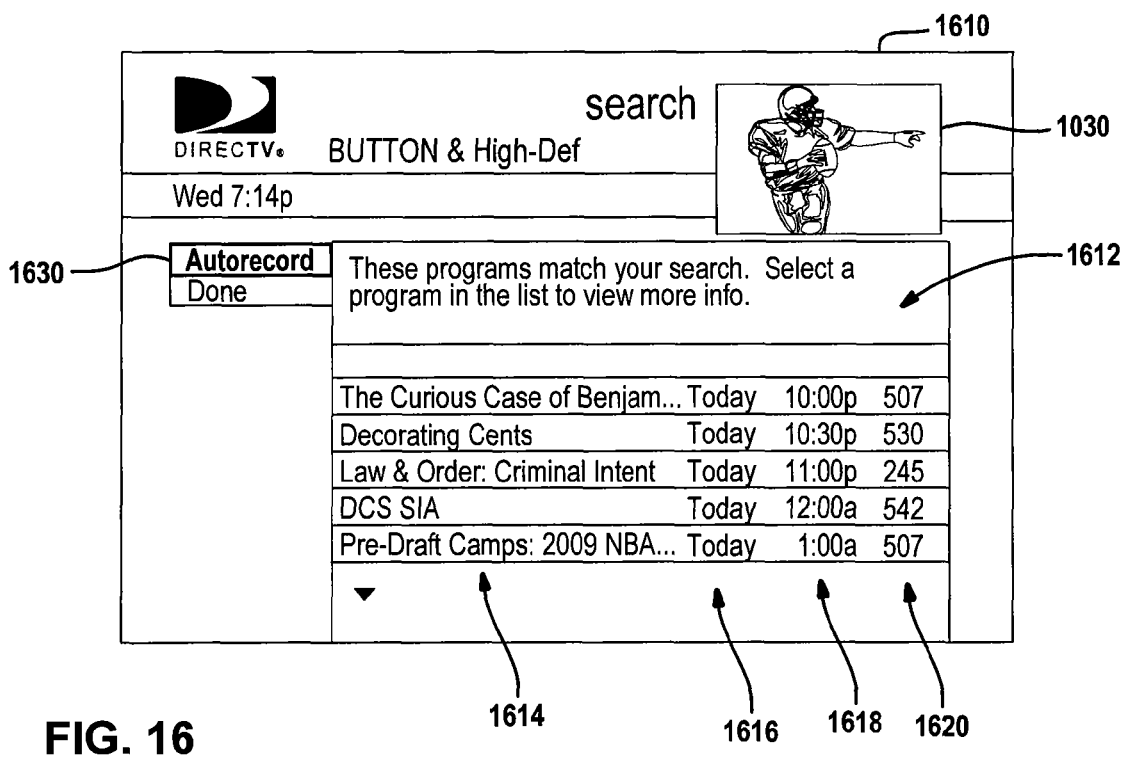
FIG. 16 is a screen display of a method for displaying after a keyword results search.

Referring now to FIG. 16, a screen display 1610 is illustrated with a results panel 1612 that corresponds to a keyword results search. In this example, the keyword is "BUTTON" and the results panel displays high-definition results. The high-definition results may be selected by a push-button on the user device or by entering a high definition search. Titles 1614, the date 1616, the time 1618 and the channel 1620 may all be displayed. An auto record button 1630 may be used to auto-record a selection in the results panel 1612.

Figure 17:
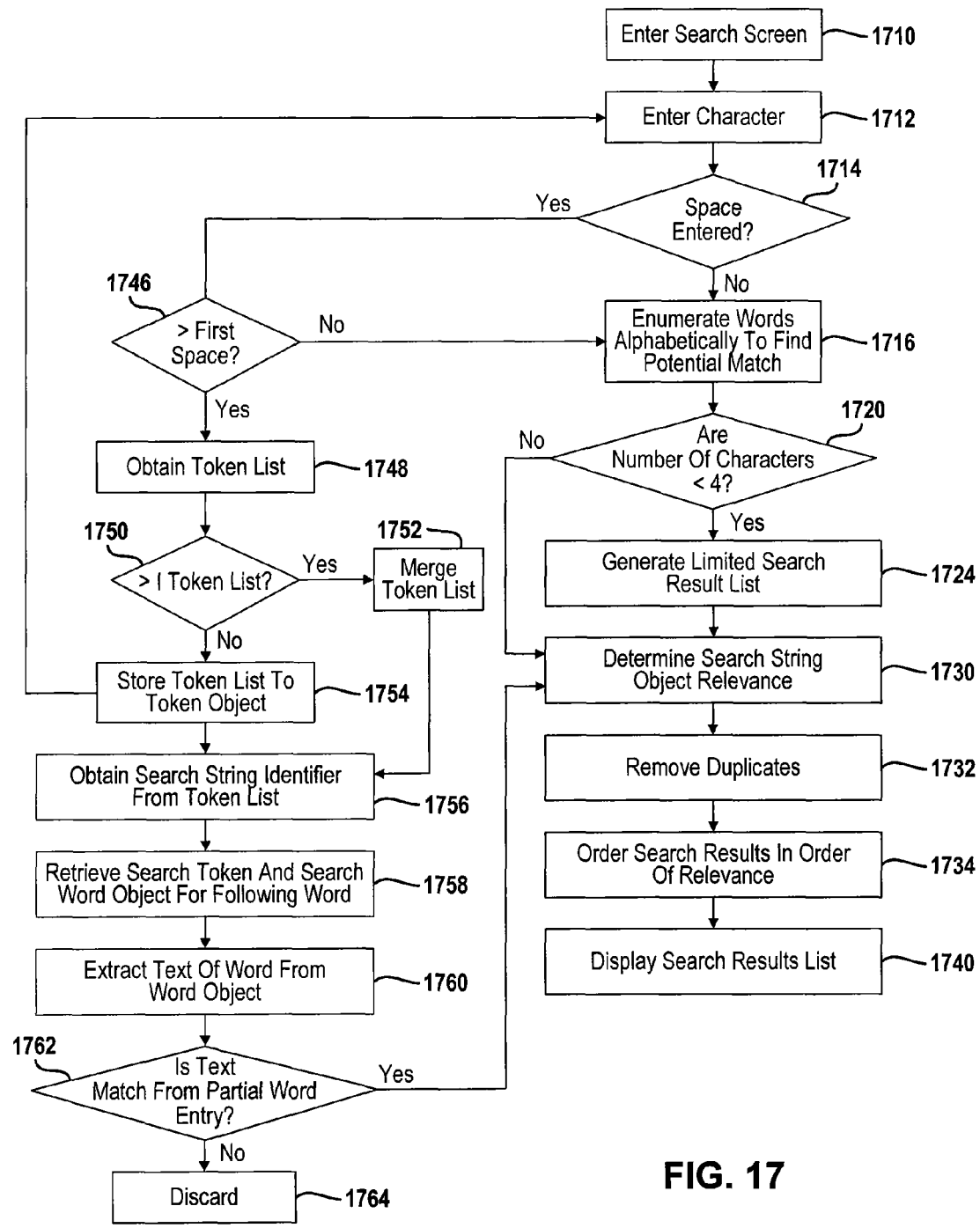
FIG. 17 is a flowchart for searching and generating a search results list.

Referring now to FIG. 17, a method for searching and generating a search results list is set forth. In step 1710, the search screen and searching process is entered. In step 1712, a character such as a number or letter is entered into the enter text area on the screen display. In step 1714, it is determined whether a space has been entered. A space de-limits a word and is useful as will be described below. If a space has not been entered, step 1716 enumerates the word objects alphabetically to find alphabetical matches. In step 1720, when the characters entered are less than a pre-determined number of characters, the potential for generating a massive search result list is increased. Therefore, when the character numbers are less than a pre-determined number, such as 4, step 1724 generates a limited search result list. The search result list may, for example, be limited to 20. It should be noted that the number 4 used in step 1720 and the number 20 used in step 1724 are merely examples and various other numbers may be used. Different numbers may be used based on various system considerations.

After step 1724, step 1730 orders the search results in order of relevance. The relevancy of the search results may be determined using a relevance field for the search string. The relevancy may be determined based upon a relevancy field for the return search string. In the following example, a top match relevance field has the highest relevance. The top match field corresponds to a top pick. A top pick may be indicated and the data objects communicated to the set top box or user device.

A first word relevance is the next relevant under the top match. The first word matches the first word of a title, channel, or name. When the first work matches the first word exactly, the relevance is increased. A first word article is the next level of relevance under the first word. The first word article indicates that the first word is in a particle as a part of speech.

After the first word article, the channel, category, title, and person name have the next level of relevance in that order. Thus, a channel name will be displayed before a category name or a title name.

The duplicates are also removed from the search results of step 1730. After the relevancy and duplicates are factored into the search results list. In step 1734, if any of the search results are the same relevance, the search results are alphabetized within the same relevancy. Step 1734 orders the search results in order of relevance and within the relevance alphabetizes. In step 1740, the search results are listed on the screen display.

Referring back to 1714, when a space is entered, step 1746 determines whether the space is more than the first space entered. In step 1746, if the space is not greater than the first space, meaning one space has been entered, steps 1716-1740 are again performed. In step 1746, if the space is greater than the first space, meaning that two or more spaces have been entered, step 1748 obtains a token list based upon the token list. In step 1750, it is determined whether this is the first token list. If this is not the first token list, meaning more than one space has been entered, step 1752 merges the current token list with the prior token list. In step 1750, if the token list is not greater than the first token list, step 1754 stores the token list to the token object. In step 1752, the token list is also merged with the token object.

In step 1756, the search string identifier is obtained from the token list. In step 1758, the search token and the search word object are retrieved for the word. In step 1760, the text of the partial word entered may be determined. If the partial word text is not matched, the partial text word is discarded in step 1764. In step 1762, if the text is matched from the partial word, the string object relevance is performed in step 1730. Step 1730 through step 1740 are performed after step 1762 as described above.

Figure 18:
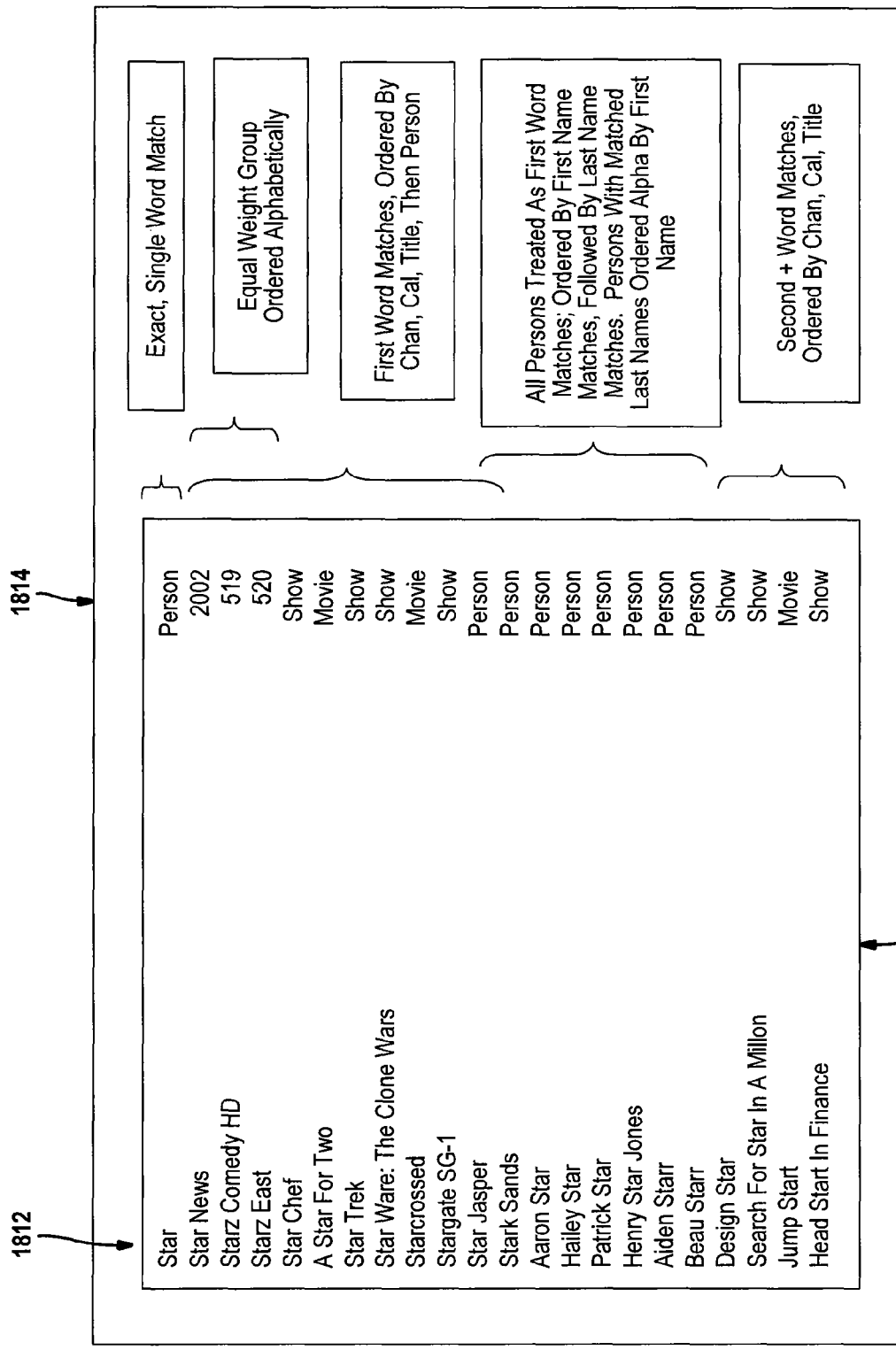
FIG. 18 is an example of relevancy ordering example list.

Referring now to FIG. 18, an example of a relevance-ordering example using a search string of "STAR" is illustrated. The list 1810 includes various character strings 1812 as well as an identifier 1814 which may include the channels, person, show, or other type of identifier. As is provided, the first element of the list 1810 includes an exact single word match that corresponds to a person. The exact single-word match is displayed first.

The next 10 items on the list are word matches that are ordered by channel, category, title, then person. Within each of the categories, such as the channel results illustrated as the second, third and fourth items on the list, the weights are the same and thus the results are alphabetized by the string 1812. In this example, there are no categories.

Items 5-10 in the list correspond to titles. Whether the search results are shows or movies is displayed in column 1814. The next group of listings are persons. In the present example, all persons are treated as first-word matches that are ordered by the first name followed by the last name matches. Persons with matched last names are ordered alphabetically by the first name.

The last four entries on the list are second plus word matches, meaning the word "STAR" matches the second word or more of the search string. The second and greater word matches are also ordered by channel category and title.

Various other rules may also be evident from the above matching list which may also be incorporated into the logic. For example, the first word being an article may have the article ignored when determining first-word matching. This is the case for the sixth item in the list which is "A STAR FOR TWO."

Figure 19:
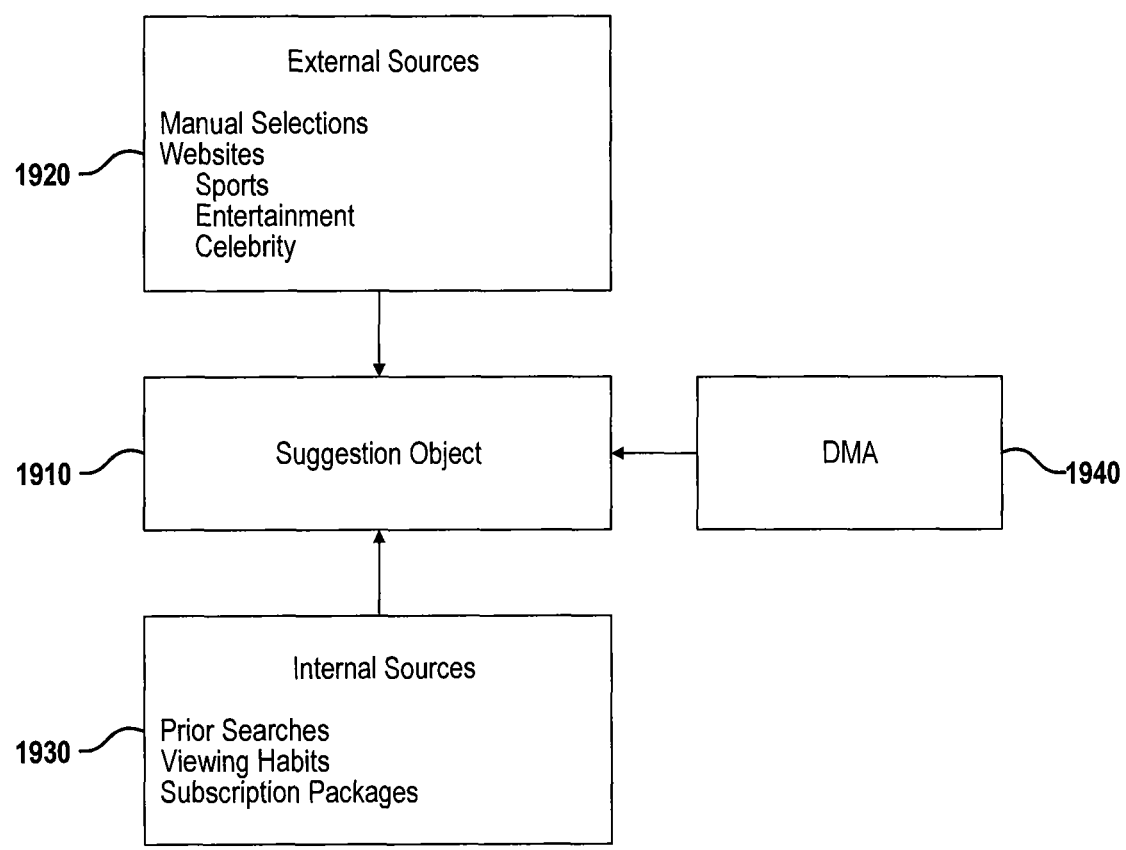
FIG. 19 is a block diagrammatic representation of inputs to a suggestion object.

Referring now to FIG. 19, the relevancy described above may be referred to as a regular relevancy. However, a dynamic relevance may also be considered in the ordering of the search results. Dynamic relevance provides new sources of input such as external search services, user viewing habits, user search habits, location of the user device, and potentially others. By providing various sources of input, the relevancy may be changed. A suggestion object 1910 may be provided with various relevancy data. The suggestion object 1910 may reside within the user device. The data within the suggestion object may be communicated from the head end and may also be gathered at the set top box and combined into the suggestion object 1910. The suggestion object 1910 may be influenced by external sources 1920. The external sources may be various sources such as entertainment magazines, "picks of the week," entertainment websites, popular culture websites, and the like. Listing various names and programming from the various websites may be performed. As well, manual input selections may also be performed.

Internal sources 1930 may also be used to influence the suggestion object. Internal sources are internal to the set top box or user device. Information from prior searches, viewing habits, subscription packages, and the like may be collected.

The designated marketing area of the user device may also be taken into account. The designated marketing area corresponds to a fixed geographic location within the relevance area. In one example, when a user enters "L" the relevance engine may determine that the sports team is the Lakers or the Lions, depending on whether the DMA is Los Angeles or Detroit. The designated marketing area or geographic location of the user device may be used to influence the results, for example, by breaking a tie in the relevance. Sports team location is a suitable purpose for using the designated marketing area.

Figure 20:
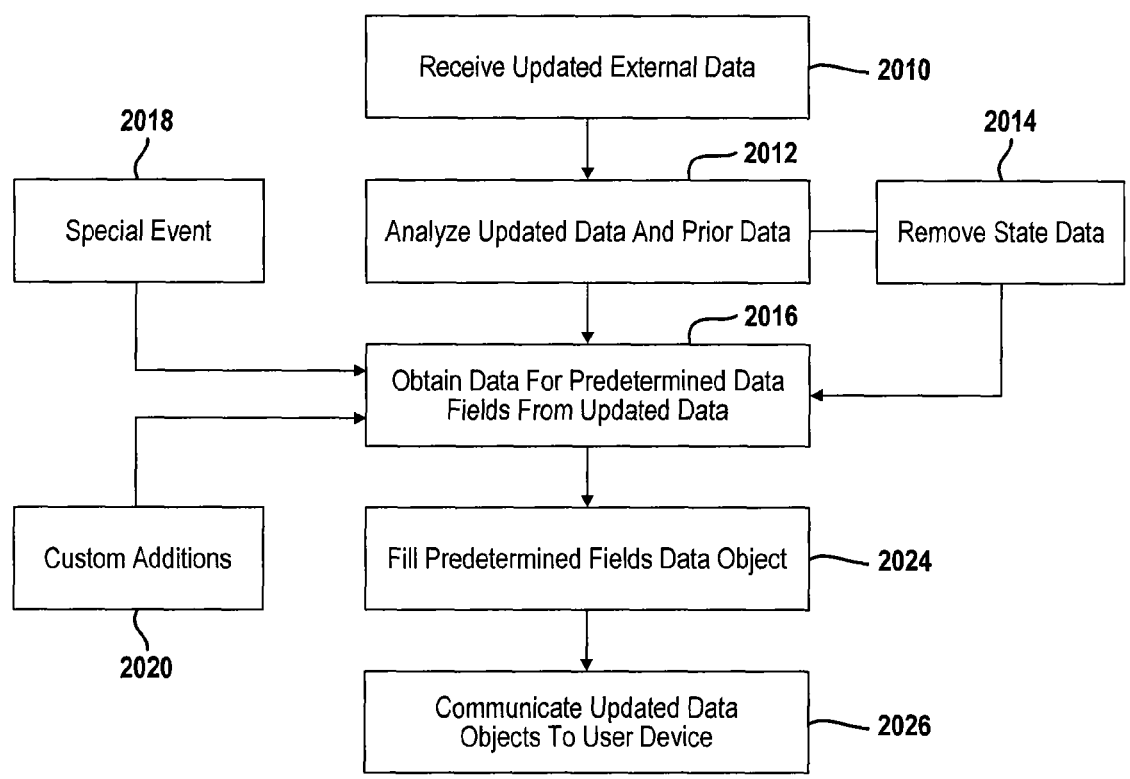
FIG. 20 is a flowchart of a method for updating a data object.

Referring now to FIG. 20, a flowchart of a method for changing updated external data is set forth. In step 2010, updated external data is received from various websites or other sources. In step 2012, the data is analyzed together with the prior data. For example, results from a rolling four-week period may be used. In step 2014, the prior data and updated data may have the stale data removed. Stale data may correspond to data that is beyond its useful period. For example, data for events that have already passed or are beyond an end date may be considered stale. In step 2016, the data for predetermined data fields is updated from the updated external data that is received. In addition, special events 2018 and customer editions 2020 may also be used to provide updated data fields. Examples of special events may be the Super Bowl, the World Series, the Olympics, the Masters or other sporting events. Other special events in step 2018 may be awards show related or the like. Custom editions 2020 may correspond to various other events that a person or governing body decides are highly important and user noteworthy.

In step 2024, the predetermined fields for the data are filled in. The predetermined fields may be of a data object. In step 2026, the updated data objects are communicated to the user device such as the set top box.

Suggestion data may have various fields associated therewith. A main version, minor version and action and number of suggestions fields may be used in a header. For example, a major version of the suggestion or minor versioning may be supported. The action may provide an indicator whether to add, replace, or delete an object. The number of suggestions that follow the header may also be provided within the header.

The suggestion data may include a query string that is the actual string used for searching. A match string may be the string that is used to match with the user query.

A comment string may also be provided that provides description for comments.

The suggestion type may also be provided within the suggestion data. The suggestion relevance, time start and time stop of the data may be also provided. The time start and time stop may correspond to a starting time or ending time. Of course, if no starting time or ending time is provided, the object may be applicable immediately or infinitely, respectively. The list of designated marketing areas to which the suggestion applies may also be provided. If an empty list of designated marketing areas is provided, it may presume that the suggestion data applies to each designated marketing area.

An attribute code and attribute action may also be provided. Attribute codes are a list of codes that identify necessary matching attributes of the device, subscription, or user to enable the suggestion. The attribute action specifies action upon the corresponding match. The attribute codes may, for example, correspond to a subscription package. Home Box Office®, Showtime®, The Movie Channel®, the NFL®, Major League Baseball®, and NBA® may correspond to various subscription packages. Other attributes may correspond to sports, kids, news and reality. The above attributes may have an attribute code associated therewith to identify the particular attribute. Of course, the list provided above is provided only by way of example and is not meant to be limiting.

An attribute action, such as show upon match, exclude upon match, boost relevance low, boost relevance medium and boost relevance high may be provided as attribute actions. The attribute actions may only be provided once per suggestion.

Figure 21:
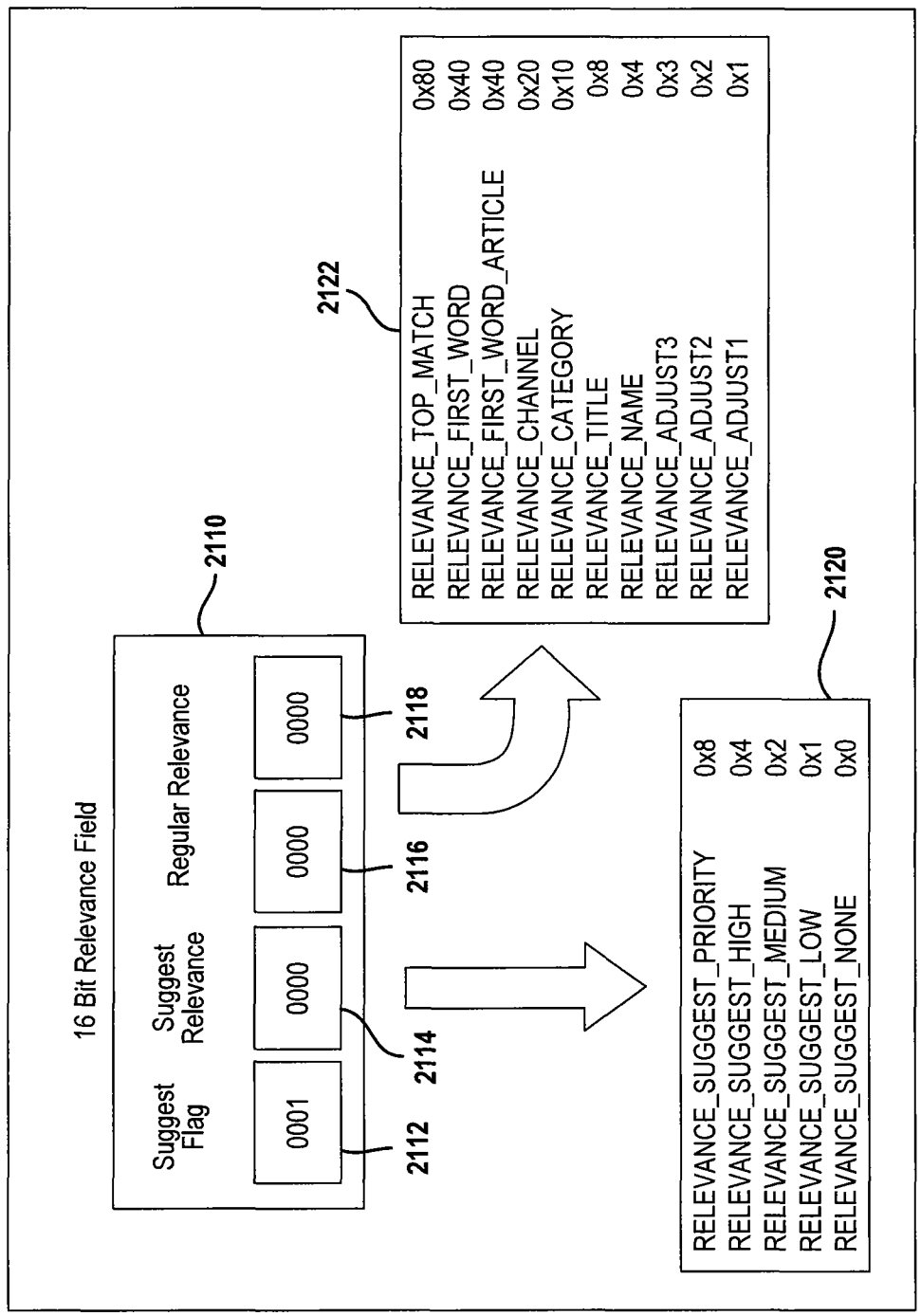
FIG. 21 is a representation of a relevance field.

Referring now to FIG. 21, a relevance field is illustrated. In this example, a 16-byte relevance field is provided. The first byte is a suggestion flag 2112. The suggestion flag is set as is illustrated, a suggestion relevance 2114 is provided. Thus, the first two bytes provide a suggestion relevance when applicable. The regular relevance bytes 2116 and 2118 may be used for determining regular relevance, rather than the dynamic or suggestion relevance. The suggestion relevance is provided in box 2120. The first four bytes in box 2112 correspond to a suggestion flag to denote a suggestion. By turning on this flag, all suggestions are higher than any regular relevant suggestions. The lower four bytes of the suggestion field 2114 are used to allow waiting of the suggestions. These values may be provided in the suggestion object from the head end to the set top box or user device. When the suggestion is the same for more than one entry, the regular relevance may be used as a tie-breaker between the same suggested relevance. The high relevance may be used sparingly and the medium suggested relevancy may be used quite often. The high relevancy may, for example, be used for a predetermined number of contents. For example, the predetermined number may be three so that the first three displayed content details may be forced to the top of the displayed search results list.

The box 2122 corresponds to the lower bytes of the relevance field 2110. The lower 16 bytes may correspond to a top match, a first word match, a first word article, a channel, a category, a title, a name, and adjustments for the lower three priorities. The priorities of the list provided above may be in order from highest to lowest. The list is provided by way of example only and is not meant to be limiting. The order of the list may be changed to suit various goals of the system operator.

Figure 22:
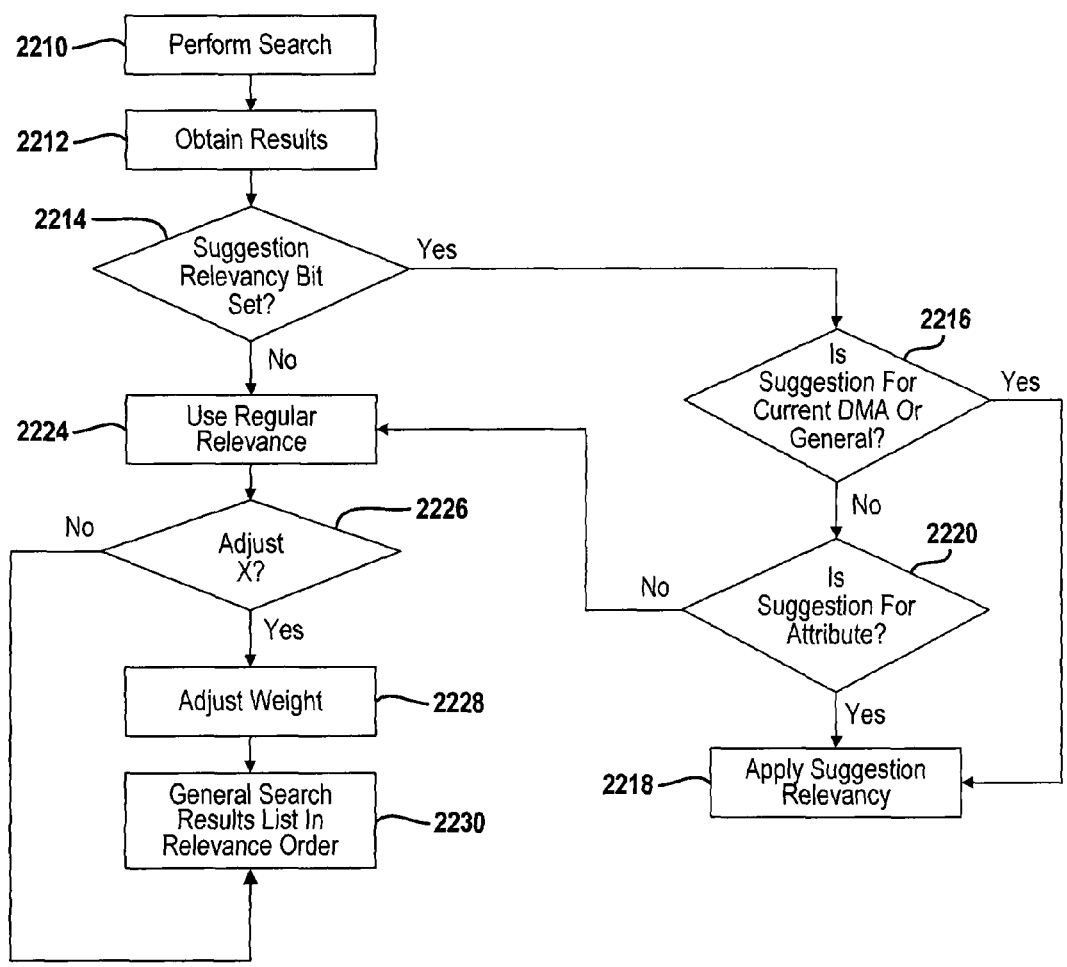
FIG. 22 is a flowchart of a method for using the relevance in conjunction with the performance of a search.

Referring now to FIG. 22, a method of performing search result list adjustments in accordance with the relevancy is set forth. In step 2210, a search is performed. Search results are obtained in step 2212. In step 2214, it is determined whether a suggestion relevancy byte set applies. If the suggestion relevancy flag illustrated in FIG. 1 is set, step 2216 determines whether the suggestion is for a current designated marketing area (DMA) or for all DMAs. If the suggestion is for the current DMA or for all DMAs, step 2218 applies the relevancy suggestion to the search result. In step 2216, if the suggestion is not for the current DMA or the general DMA, step 2220 determines if the suggestion is for an attribute. If the suggestion is for an attribute, then the suggestion relevancy is applied to the list item. If the suggestion is not for an attribute, then the regular relevance is applied in step 2224. In step 2214, when the suggestion relevancy byte set does not indicate a suggestion, step 2224 is also performed. After step 2224, it is determined whether an adjustment factor is to be applied in step 2226. If an adjustment factor is to be applied, an adjustment weight may be provided in step 2228. Adjustment factor described in steps 2226 and 2228 may allow search results to have small adjustments within a relevance category to change the order within the category. Thus, a slightly higher relevance may be provided for a certain category which may be set by an operator of the system. After step 2228 and after step 2226 determines an adjustment is not made, step 2230 generates a search results list in relevance order. Step 2230 may incorporate the steps of 1730-1740 in which the results are displayed, duplicates are moved, and the order of the search is displayed by relevance.

Figure 23:
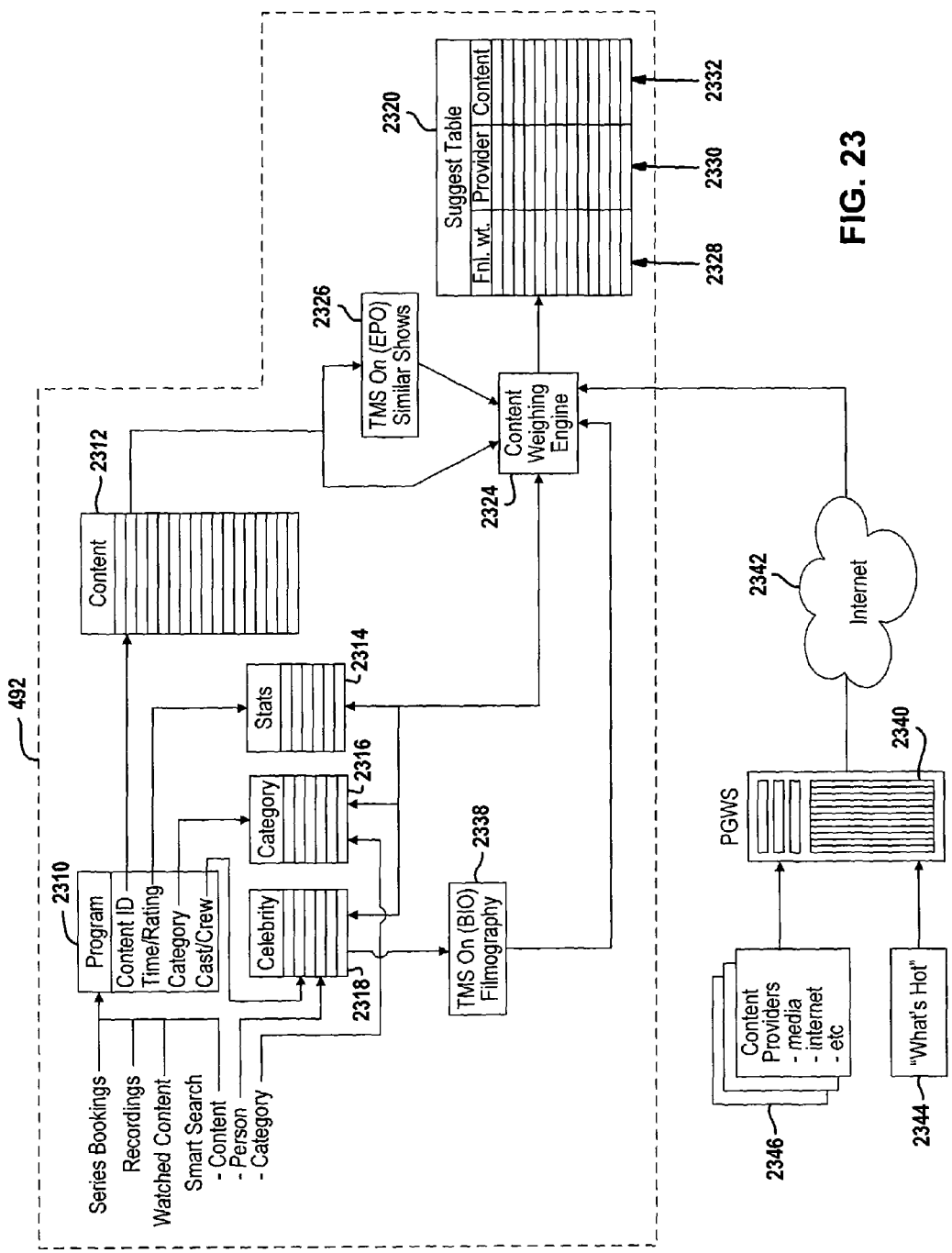
FIG. 23 is a block diagrammatic view of a method for determining weights for content material.

Referring now to FIG. 23, as mentioned above, internal sources may also be used to adjust the suggestion object. In this example, the internal suggestion module 492 illustrated in FIG. 3 is set forth. In this example, the internal suggestion module 492 may monitor the activity at the user device to provide suggestion data for changing the display of content based on content used at the user device. Various actions may be monitored by the internal suggestion module 492. The suggestion module 492 may be used to adjust search results or be used to generate suggestions to the user through the use of the suggestion objects. The suggestion objects may be generated without entering search text.

Suggestion objects may be generated from weights in the weighting engine that are derived from internal data from the user device including but not limited to series bookings, recordings, watched content and smart search content may all be provided to a program module 2310. The program module 2310 may determine important data attributes such as the content identifier and place the content identifier into a content identifier list 2312. Further, the program may also have a time and rating identified which is placed into a statistics table 2314. The amount of times watched may also be placed into the statistics table. The statistics of the content may be used to determine suggestion data. The category of the program may also be placed into a category table 2316. The cast and crew of the program may be placed in a celebrity table 2318. For a smart search, the person and category may be provided directly to the celebrity table 2318 and the category table 2316. A suggestion table 2320 may be generated from various inputs based on various inputs based upon the content table, celebrity table, and a statistics table. The weighting engine The content table 2312 may include the content identifier of the content of interest, the source of the content that triggered the entry to be added at the table. The source of the content may be the series booking, recordings, watch content, or a smart search. Also, the last time the entry was updated may also be provided. A limited number of content table entries may be provided.

The celebrity table 3218 may include a name of the celebrity, a byte field noting which source triggered the entry, such as a series booking, recording, watch content, or the like and a count of the number of times the entry was added or updated. A list time update may also be provided in the celebrity table 3218.

The category table 3218 may include a category index, a rating corresponding to the content being added, a source corresponds to the source such as a series booking, recording watch content, or the like. The last time updated may also be a field within the category table 3216.

The statistics table 2314 may include various statistics such as the number of entries that were added as a result of the user watching a live event, the number of entries that were added as a result of the users viewing a recording number, the morning entries, the number of afternoon entries, the number of prime time entries, the number of late-night entries, and the number of day part entries. This allows entries during the time in which the user most likely watches TV to be suggested.

A weighting engine 2324 may receive the content from the content table 2312 which may be used to generate a weight. An external source, such as Times Media Systems "ON" system may be used to provide similar or related content to the content illustrated or provided in the content table 2312. Thus, internal and external sources of weighting may be provided. The actual content in the table 2312 and similar content derived from an external service in box 2326 may be used. The external service may use the data from the content table 2312 to make the determination of similar content. The weights determined in the content weighting engine may be used to search content available from the program guide objects for example. The final weight column 2328, a provider column 2330 and a content column 2332 may be used to identify the weight or ranking, provider and content of a particular content available to be viewed or recorded at the user device.

The content weighting engine 2324 may also rank the top celebrities from the celebrity table which is used to adjust the content weighting engine. An external source 2338 may also provide filmography data to the weighting engine 2324. The weighting engine 2324 may use filmography data and celebrity data in the content weighting engine.

An additional input from a program guide web service 2340 may also be provided. The set top box or user device may be connected to a program guide web service through the Internet 2342 or other network. The program guide web service 2340 may provide additional inputs such as a What's Hot list 2344 or additional content from other content providers 2346. The What's Hot list may be a ranked list of the most watched or most ordered content or a combination of both. The What's Hot list 2344 and the content providers content 2346 may be provided directly to the weighting engine or directly to the suggestion table 2320.

The content weighting engine 2324 may be used to determine a weight so that the most relevant content suggestions may be provided to the user of the user device. For example, the source of the content may be considered. For example, a recording playback may have a higher weight than a series recording content. Recorded content may have a ranking as well. Watched content may also have a weight. The similar shows or content may have a lower weight than the series recording content, recorded content, or watched content. The TMS "ON" filmography content from box 2338 may also have a weight. Searched content may have a lower weight than the other types of adjustments described above. A watched content may also have a weight factor. Of course, the various weightings and sources for adjustment are provided for by way of example and are not meant to be limiting. Various changes may be evident to a system operator.

Figure 24:
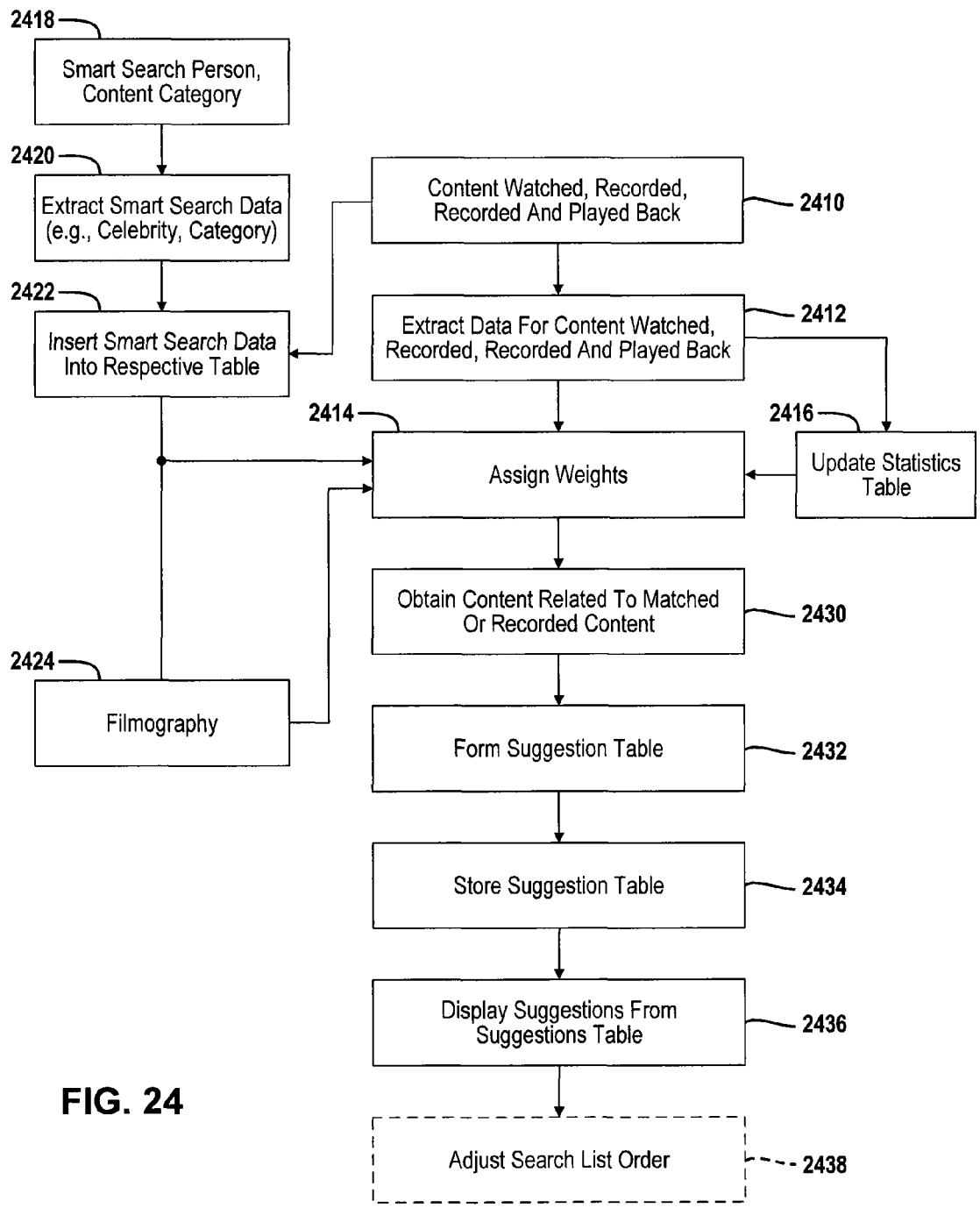
FIG. 24 is a flowchart of a method for assigning weights according to the present disclosure.

Referring now to FIG. 24, a flowchart of the operation of the block diagram of FIG. 23 is illustrated. In step 2410, content is selected for watched, recorded or recorded and played back. In step 2412, data is extracted for recorded playback or recorded content. In step 2414, the extracted data is communicated to the content weighting engine where weights are assigned in response thereto. A statistics table may be updated in step 2416 during the process. The statistics table data may be used to influence the weights. In step 2414, weights may be assigned to the various data for use in generating the suggestion table. The weights may be assigned based on steps 2410, 2412 and other sources described below.

A smart search person or category may be determined from a smart search performed in step 2418. In step 2420, the data is extracted from the person or content category. In step 2422, the smart search is inserted into the respective celebrity table 3218 or the category table 3216 of FIG. 23. The inputs from step 2422 are provided to the assign weight step 2414 and may be used in assigning weights in a weight table. An external source such as the filmography block 2338 illustrated in FIG. 23 may be used in filmography step 2424 to provide data for assigning the weights in the assigned weight step 2414.

After the weights are assigned in step 2414, a search of content available may be compared to the weights in step 2430 which is a search query that searches the data for search results. This may be a matching process in which material, titles, actors in the weight table as well as the weights are matched. The content matched is used to form a suggestion table in order of highest weights being at the top in step 2432. After the suggestion table is formed in step 2432, the suggestion table is stored in step 2434. In step 2436 the suggestions (suggested content) may be displayed on the display. Some or all of the suggested content may be displayed. An adjustment of the list of the search results may be performed in step 2438 based on the suggestions from the suggestion table when other searching is performed. Step 2438 may be optional.

Figure 25:
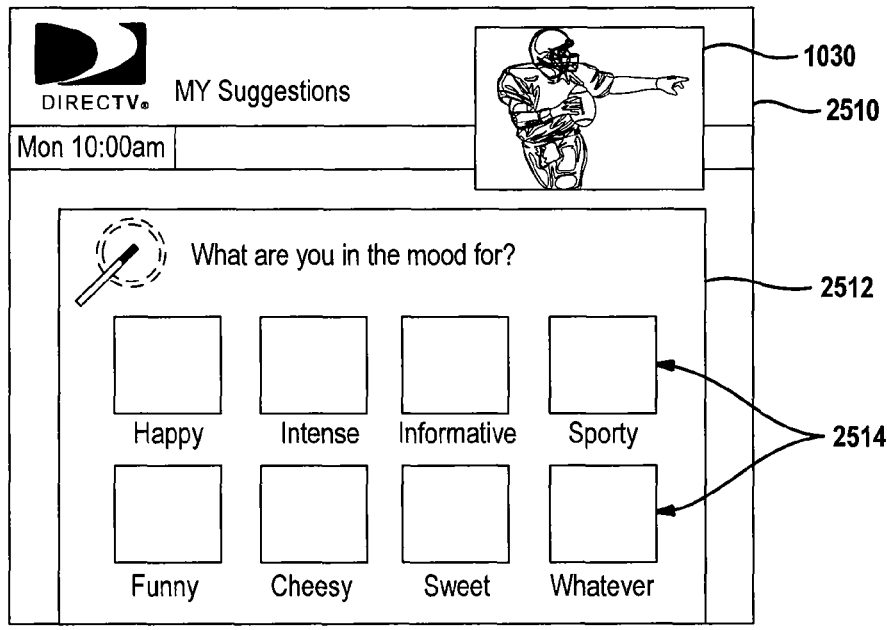
FIG. 25 is a screen display for generating smart browser results.

Referring now to FIG. 25, a directed search engine display 2510 is illustrated. The directed search engine display may be generated by entering a selection in a quick menu such as the quick menu illustrated in FIG. 9. The search engine 2510 may observe the set top box user's usage pattern and acquire external data to compute a list of content targeted toward the user of the set top box as described above but with the additional user-selected influences such as mood, etc. The targeted list may be obtained as was described in FIGS. 23 and 24. The browsing wizard 2510 may be presented to the user prior to any content recommendations, to guide the user along the task by asking simple questions. The browser wizard 2510 maybe generates suggestions based on collected set top box usage.

The query panel 2512 may include a query such as "what are you in the mood for"? A number of choices 2514 may be presented to the user. In this example, happy, intense, informative, sporty, funny, cheesy, sweet, whatever, are all listed as selections. By using a user interface, a certain selection may be provided. A number of alternative screens once one of the selections is performed may ask other questions or provide a query for directing the user in a particular direction.

Figure 26:
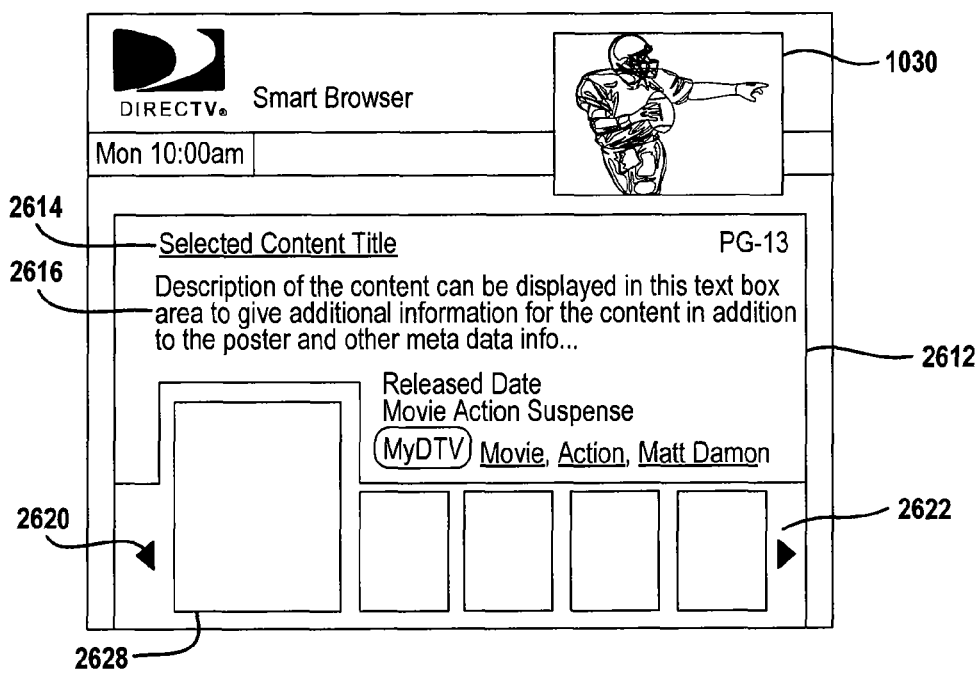
FIG. 26 is a screen display of a method for selecting a content title.

Referring now to FIG. 26, a screen display 2610 having a content selection panel 2612 is illustrated. The content selection panel may include a title portion 2614, a description portion 2616, and the like. The selected content title 2614 may have a thumbnail 2618 that is selected. The thumbnail corresponds to the selected content title. The description portion 2616 also corresponds to the thumbnail 2618. Other selections may be scrolled using the arrow keys 2620 and 2622. In the present example, scrolling right and left may cause the selected content title 2614 and the description portion 2616 to change.

Figure 27:
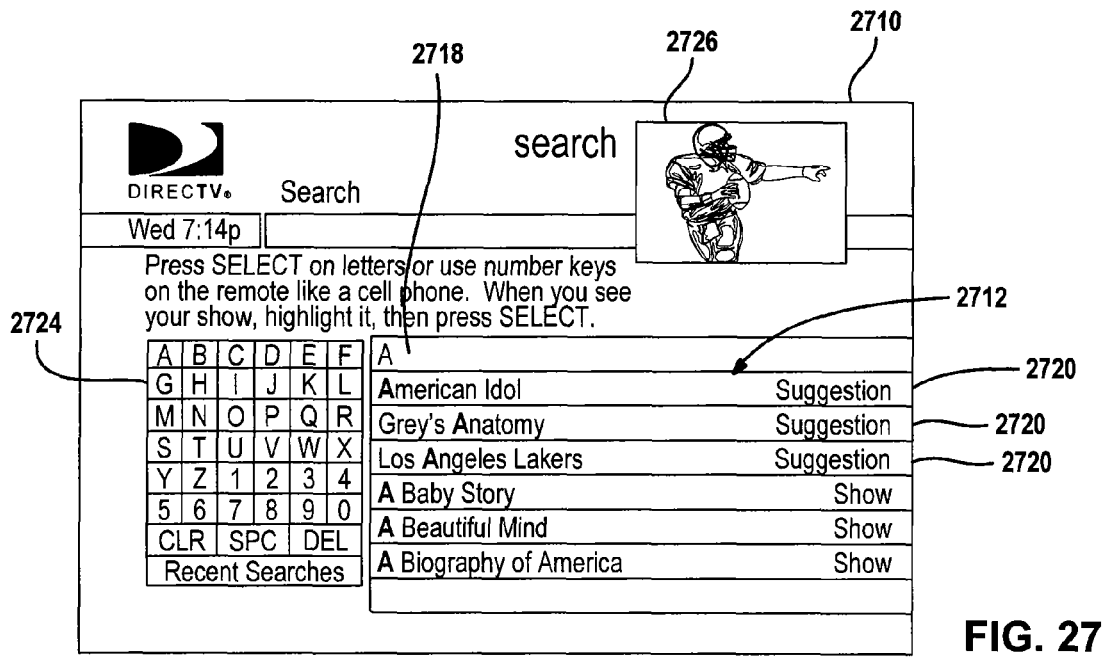
FIG. 27 is a screen display for a search process, including suggestions.

Referring now to FIG. 27, a screen display 2710 illustrates the use of suggestion data. The suggestion data in step 2710 is illustrated in the results panel 2712. The results panel is generated in response to the insertion of the letter "a" in the entered text box 2718. A suggestion indicator 2720 is provided for each of the suggestion titles. The suggestions may appear in a different color to differentiate them from regular results. The suggestions may be limited to a predetermined small number such as less than four so that the other choices may be viewed. The present example provides three. In this example, it is presumed that the three titles in the suggestion are in exactly the same weighting and, therefore, are displayed in alphabetical order. The ordering may be changed easily, for example, if the American Idol premiere was that night then the American Idol suggestion may be assigned a higher suggested relevance to insure that their title is at the top of the list no matter which word was matched.

Figure 28:
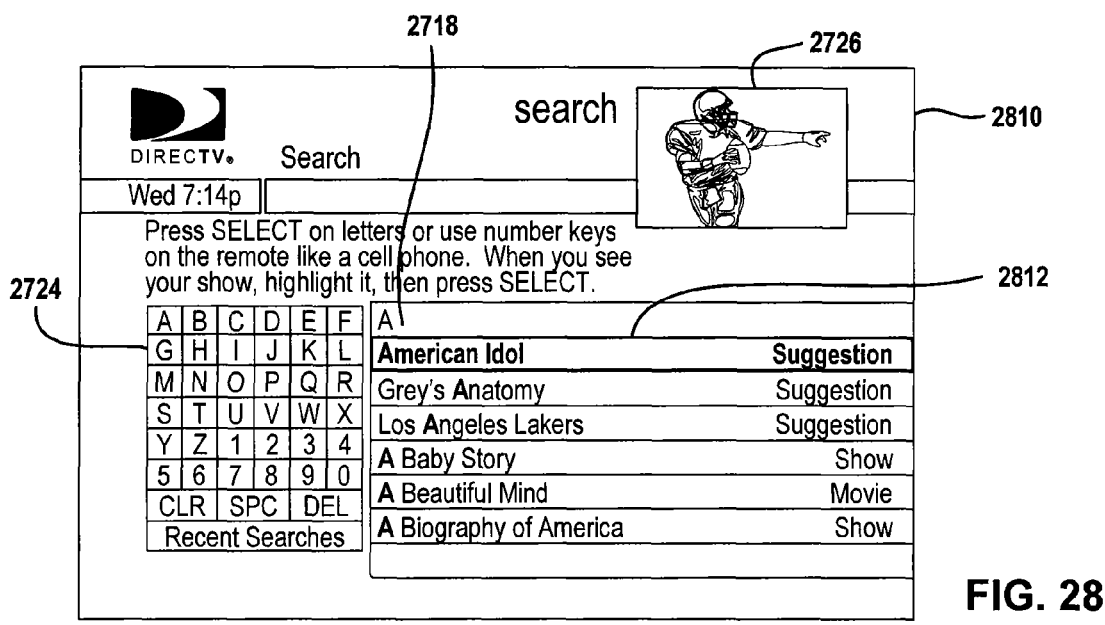
FIG. 28 is a representation of the suggestion box of FIG. 27.

Referring now to FIG. 28, a screen display 2810 for selecting one of the suggestion items is set forth. In this example, the American Idol title has a selection box 2812 therearound. The arrow keys of the remote control or the user device may be used. Because the show may be internally tagged as a "show suggestion," the query string "American Idol" may be considered an exact title match.

Figure 29:
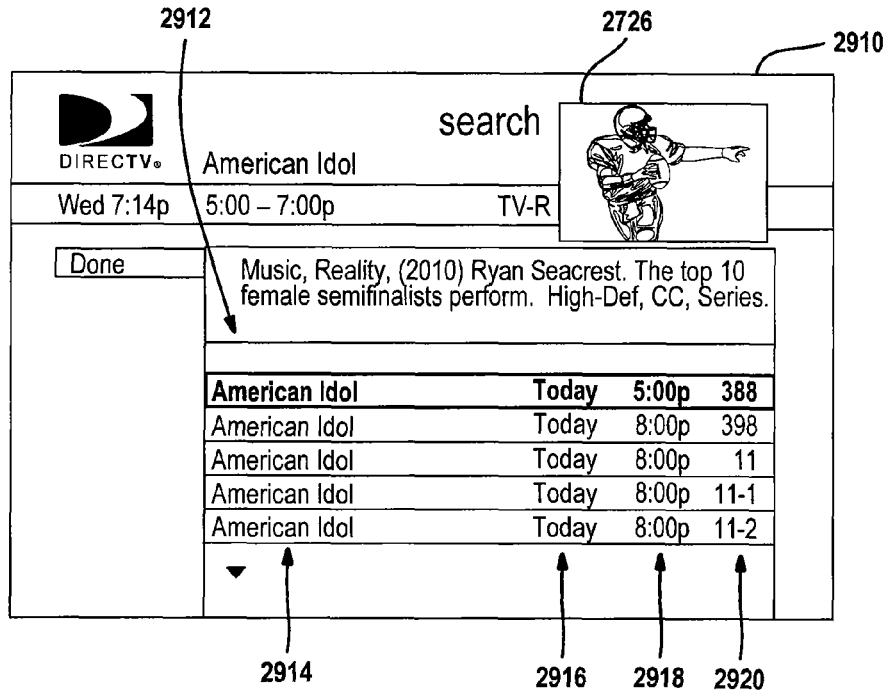
FIG. 29 is a screen display of a method for displaying suggestion content.

Referring now to FIG. 29, after selecting a content title in FIG. 28, the screen display 2910 in FIG. 29 displays a results list 2912 having titles 2914, the date 2916, the time 2918, and the channel 2920. This behavior was described in the general search process.

Figure 30:
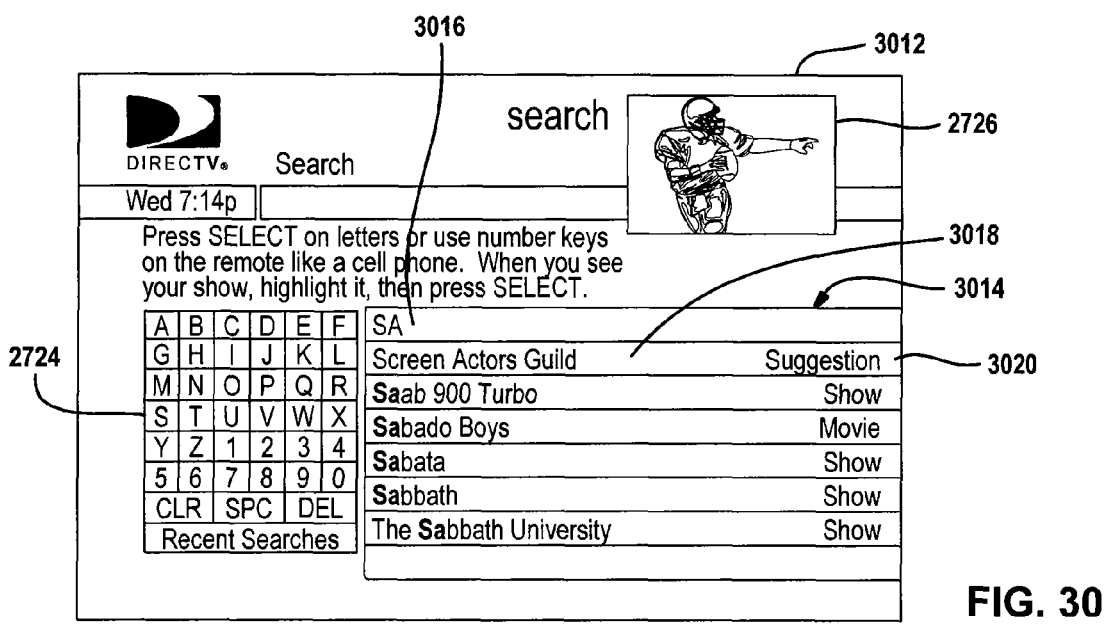
FIG. 30 is a screen display of a method for providing a suggestion for an aliased search entry.

Referring now to FIG. 30, a screen display 3012 is illustrated that includes a selection panel 3014 that includes an entered text area 3016. In this example, the entered text area includes "SA." In this example, an alias feature is used. In this example, the Screen Actor's Guild Awards is known as "the SAG awards." The suggestion match string phrase is "SAG-SCREEN ACTOR'S GUILD." While the actual query string is "SCREEN ACTOR'S GUILD." A suggested match 3018 corresponding to the "SCREEN ACTOR'S GUILD" is provided with a suggestion indicator 3020 adjacent thereto.

A keypad 2724 and a current channel viewing panel 2726 may also be included in the screen display 3012.

Figure 31:
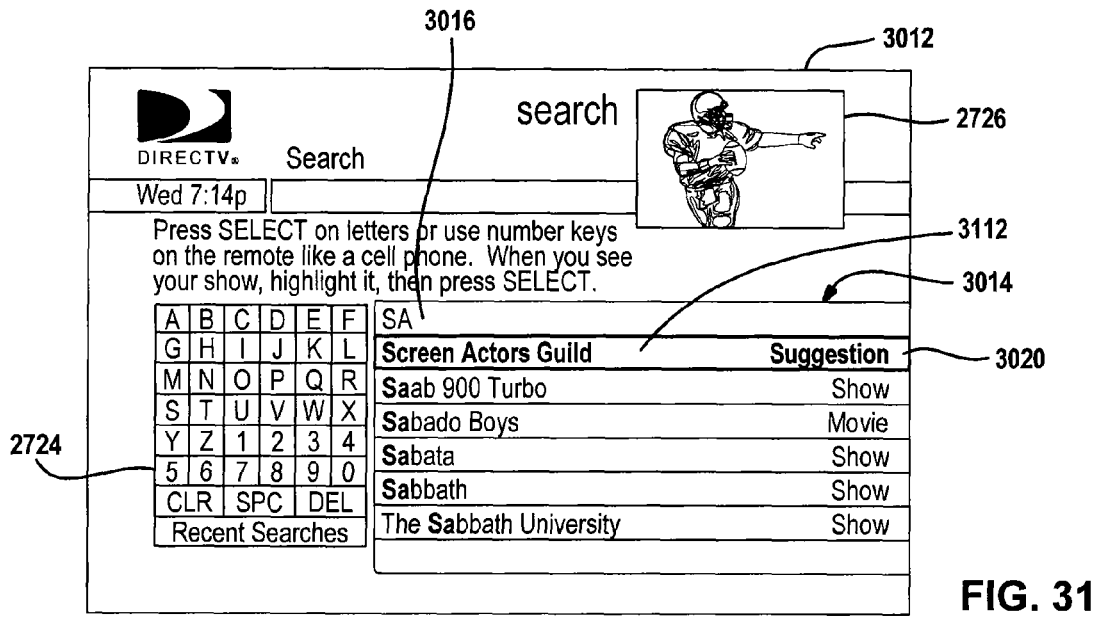
FIG. 31 is a screen display of a method for selecting an aliased suggestion.

Referring now to FIG. 31, a selection box 3112 is added to the screen display 3012 of FIG. 30. The selection box 3112 may be manipulated by a user interface and selected.

Figure 32:
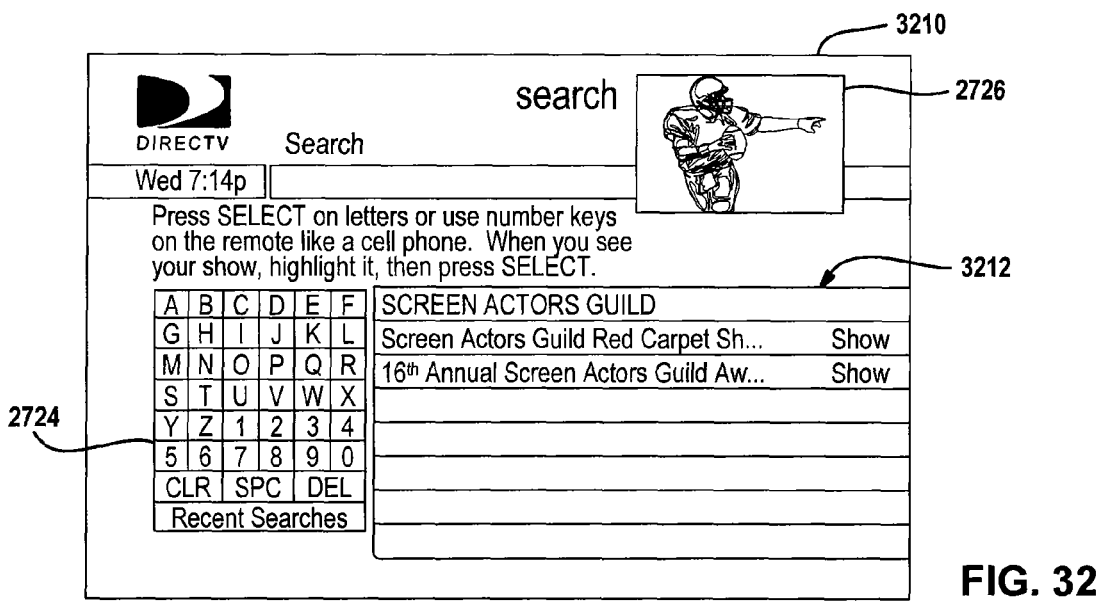
FIG. 32 is a screen display of the selection from FIG. 31.

Referring now to FIG. 32, upon selecting the SCREEN ACTOR'S GUILD suggestion in FIG. 31, the screen display 3210 is provided. In this example, the results panel 3212 provides two suggestions for the SCREEN ACTOR'S GUILD in shows. The "SCREEN ACTOR'S GUILD RED CARPET SHOW" and the "$16^{TH}$ ANNUAL SCREEN ACTOR'S GUILD AWARDS" are provided for selections.

Figure 33:
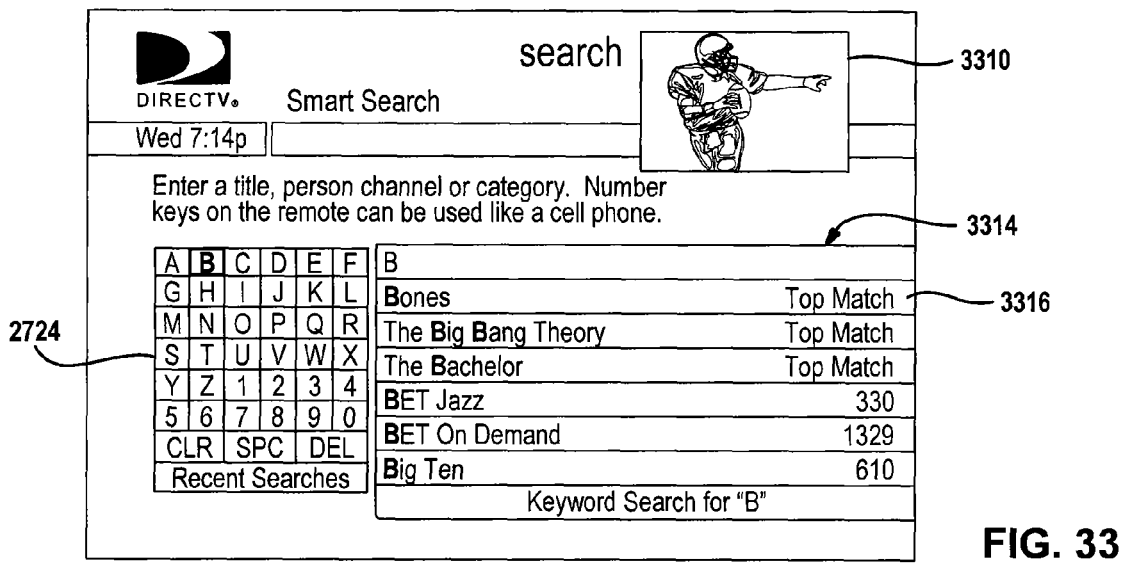
FIG. 33 is a screen display of a method for displaying a top match.

Referring now to FIG. 33, a screen display 3310 is illustrated for including top matches 3312 in the results panel 3314. In this example, the "top match" selections are limited to three. However, the system may be set-up for including more or less than three top matches.

Providing top matches may also be user selectable. That is, the user devices may be presented with a menu for disabling top matches. The top matches may be provided to the set top box using a data object as described above. The data object may be included within a suggestion data object or another type of data object. The top match list may be created by using historical data ratings, premiers, finals, special events, major sporting events, major actors and the like. The top matches may be provided in a data object on a regular basis such as weekly. The top match data may be user-device specific. A top match selections may provide a top match indicator 3316.

Figure 34:
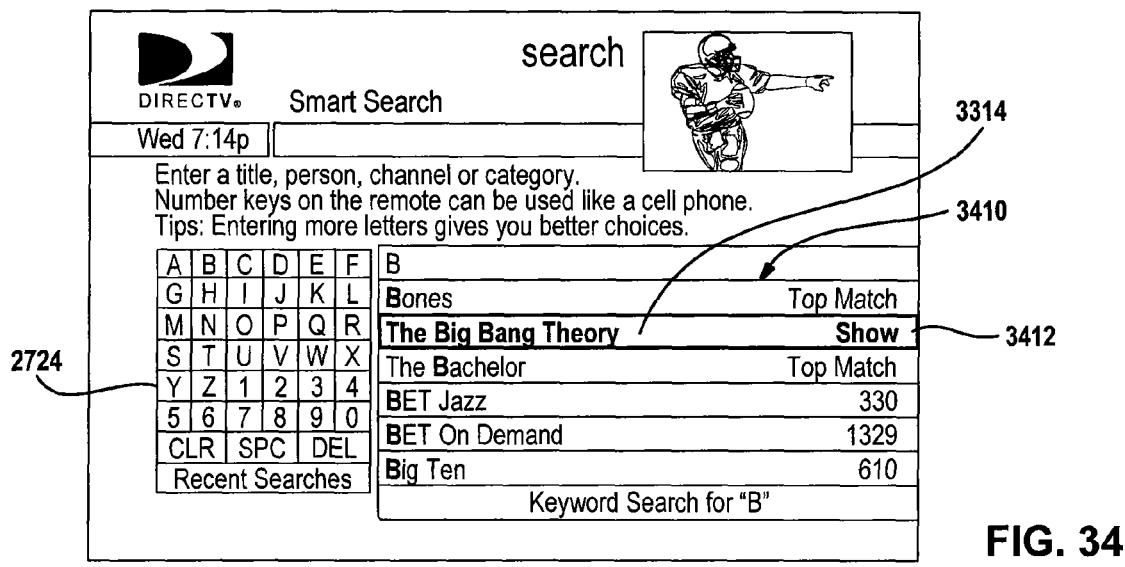
FIG. 34 is a method for selecting a top match.

Referring now to FIG. 34, when one of the top match selections 3312 is highlighted with a cursor or selection box 3410, the content type of the match 3412 is provided. In this example, the top match title changes from "top match" to "show upon highlighting."

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
    receiving a plurality of data objects at a user device, said plurality of data objects including program guide data;
    parsing search data from the plurality of data objects at the user device to form a search index different than the program guide data, said search index comprising search string objects, token objects and word objects, said word objects each having a first word and a second word associated therewith, said search string objects each having at least one token identifier associated therewith;
    storing the search index within the user device separate from the program guide data;
    in response to a search query, searching the search index stored within the user device by identifying the word object from the search query alphabetically until a second space is entered in a user interface, and, after the second space is entered performing:
        identifying token objects from the word object,
        identifying a string object from the token object, and
        obtaining a token list having token objects and thereafter storing the token list to one of the token objects;
    generating search results from the search index; and
    displaying search results.

2. A method as recited in claim 1 wherein receiving a plurality of data objects comprises receiving a plurality of program guide objects.

3. A method as recited in claim 1 wherein receiving a plurality of data objects comprises receiving a plurality of channel objects.

4. A method as recited in claim 1 wherein receiving a plurality of data objects comprises receiving a plurality of program guide objects and channel objects.

5. A method as recited in claim 4 wherein receiving a plurality of data objects comprises receiving the plurality of program guide objects and channel objects through a satellite.

6. A method as recited in claim 1 wherein receiving a plurality of data objects comprises receiving a plurality of schedule objects.

7. A method as recited in claim 1 wherein receiving a plurality of data objects comprises receiving a plurality of video-on-demand objects.

8. A method as recited in claim 1 wherein the search string objects comprise a string identifier, a token identifier and a data object identifier.

9. A method as recited in claim 1 wherein the search string objects comprise a string identifier, a token identifier, and an object identifier identifying a first data object of the plurality of data objects.

10. A method as recited in claim 9 further comprising removing a search string object of the search in response to the object identifier.

11. A method as recited in claim 1 wherein storing search data comprises storing the word objects alphabetically based on the first word.

12. A method as recited in claim 1 wherein storing search data comprises storing the search data in a database within the user device.

13. A method as recited in claim 1 further comprising weighting the search results with a relevance weight associated with a string object, wherein displaying the search results comprises displaying the search results in response to the relevance weight.

14. A method as recited in claim 13 wherein the relevance weight comprises a weight for one of a top match type, a first word article type or a string type.

15. A method as recited in claim 14 wherein the relevance weight is prioritized in order of the top match type, the first word article type or the string type.

16. A method as recited in claim 13 wherein the relevance weight corresponds to a string type.

17. A method as recited in claim 16 wherein the string type comprises one of a channel string type, category string type, title string type and name string type.

18. A method as recited in claim 13 wherein the string type is prioritized in order of channel string type, category string type, title string type and name string type.

19. A method as recited in claim 13 wherein when the relevance weight is equal, displaying comprises displaying the search results in alphabetical order.

20. A method as recited in claim 1 wherein generating search results comprises generating search results in response to suggestion data.

21. A method as recited in claim 20 wherein generating search results comprises generating search results in response to a suggestion data from different sources.

22. A method as recited in claim 20 further comprising communicating the suggestion data to the user device from a head end.

23. A method as recited in claim 20 further comprising generating suggestion data at the user device.

24. A method as recited in claim 20 further comprising generating suggestion data at the user device based on content used at the user device.

25. A method as recited in claim 20 further comprising generating suggestion data at the user device in response to customer subscription services.

26. A method as recited in claim 20 further comprising generating suggestion data in response to previous purchase data.

27. A method as recited in claim 20 further comprising generating suggestion data in response to series recording data.

28. A method as recited in claim 20 further comprising generating suggestion data in response to watched content.

29. A method as recited in claim 20 further comprising generating suggestion data in response to searched content.

30. A method as recited in claim 20 further comprising generating suggestion data in response to searched movie content.

31. A method as recited in claim 20 further comprising generating suggestion data in response to searched person content.

32. A method as recited in claim 20 further comprising generating suggestion data in response to searched person content and filmography data from an external source.

33. A method as recited in claim 20 further comprising generating suggestion data in response to content use statistics.

34. A method as recited in claim 20 further comprising generating suggestion data in response to content used and similar content data from an external source.

35. A method as recited in claim 20 further comprising generating suggestion data in response to a user device location.

36. A method as recited in claim 20 further comprising generating suggestion data in response to a user device location and content used at the user device.

37. A method as recited in claim 20 further comprising generating the suggestion data in response to an external source to the user device.

38. A method as recited in claim 20 further comprising generating the suggestion data in response to a website external to a content processing system.

39. A method as recited in claim 20 further comprising generating suggestion data in response to predicted popularity.

40. A method as recited in claim 20 further comprising generating suggestion data in response to a ranked list of content from an external source.

41. A method as recited in claim 20 further comprising generating suggestion data in response to content from an external source and content used at a user device.

42. A method as recited in claim 20 further comprising generating suggestion data in response to content from an external source and content used at a user device and user device location.

43. A user device comprising:
a receiver receiving a plurality of data objects, said data objects including program guide data;
a search module comprising a parsing module parsing search data from the plurality of data objects to form a search index different than the program guide data and a memory interface module storing the search index within a memory of the user device separate from the program guide data, said search index comprising search string objects, token objects and word objects, said token objects having a token identifier, a word object identifier for one of the word objects and a string type corresponding to search string objects, said word objects each having a first word and a second word associated therewith, said search string objects each having at least one token identifier associated therewith;

said search module comprising a search performance module searching the search index using the word objects, the string objects and the token objects in response to a search query by identifying the word object alphabetically until a second space is entered in a user interface, and after the second space is entered performing:
  identifying token objects from the word object,
  identifying a string object from the token object, and
  obtaining a token list having token objects and thereafter stores the token list to one of the token objects to form search data;

said search module comprising a search results module generating search results from the search data; and a display displaying search results.

44. A user device as recited in claim 43 wherein the plurality of data objects comprises a plurality of program guide objects.

45. A user device as recited in claim 43 wherein the plurality of data objects comprises a plurality of channel objects.

46. A user device as recited in claim 43 wherein the plurality of data objects comprises a plurality of program guide objects and channel objects.

47. A user device as recited in claim 43 wherein the plurality of data objects comprises a plurality of schedule objects.

48. A user device as recited in claim 43 wherein the plurality of data objects comprises a plurality of video-on-demand objects.

49. A user device as recited in claim 43 wherein the parsing module parses search data into search string objects.

50. A user device as recited in claim 49 wherein the search string objects comprise a string identifier and a token identifier.

51. A user device as recited in claim 49 wherein the search string objects comprise a string identifier, a token identifier and a data object identifier.

52. A user device as recited in claim 49 wherein the search string objects comprise a string identifier, a token identifier, and an object identifier identifying a first data object of the plurality of data objects.

53. A user device as recited in claim 52 wherein the parsing module removes a search string object of the search in response to the object identifier.

54. A user device as recited in claim 43 wherein the memory interface module stores the word objects alphabetically based on the first word.

55. A user device as recited in claim 43 wherein the search module comprises a relevancy engine having relevancy weights therein, said relevancy engine weighting the search results with a relevance weight of the relevancy weights associated with a string object, wherein the display displays the search results in response to the relevance weight.

56. A user device as recited in claim 55 wherein the relevance weight comprises a weight for one of a top match type, a first word article type or a string type.

57. A user device as recited in claim 56 wherein the relevance weight is prioritized in order of the top match type, the first word article type or the string type.

58. A user device as recited in claim 55 wherein the relevance weight is equal, said display displaying the search results in alphabetical order.

59. A user device as recited in claim 55 wherein the relevance weight corresponds to a string type.

60. A user device as recited in claim 59 wherein the string type comprises one of a channel string type, category string type, title string type and name string type.

61. A user device as recited in claim 59 wherein the string type is prioritized in order of channel string type, category string type, title string type and name string type.

62. A user device as recited in claim 43 wherein search results module generates search results in response to suggestion data.

63. A user device as recited in claim 62 further comprising a head end communicating the suggestion data to the user device.

64. A user device as recited in claim 62 wherein the user device generates suggestion data.

65. A user device as recited in claim 62 wherein the user device generates the suggestion data based on content used at the user device.

66. A user device as recited in claim 62 wherein the user device generates the suggestion data based on customer subscription services.

67. A user device as recited in claim 62 wherein the user device generates the suggestion data based on previous purchase data.

68. A user device as recited in claim 62 wherein the user device generates the suggestion data based on series recording data.

69. A user device as recited in claim 62 wherein the user device generates the suggestion data based on watched content.

70. A user device as recited in claim 62 wherein the user device generates the suggestion data based on searched content.

71. A user device as recited in claim 62 wherein the user device generates the suggestion data based on searched movie content.

72. A user device as recited in claim 62 wherein the user device generates the suggestion data based on searched person content.

73. A user device as recited in claim 62 wherein the user device generates the suggestion data based on searched person content and filmography data from an external source.

74. A user device as recited in claim 62 wherein the user device generates the suggestion data based on content use statistics.

75. A user device as recited in claim 62 wherein the user device generates the suggestion data based on content used and similar content data from an external source.

76. A user device as recited in claim 62 wherein the user device generates the suggestion data based on a user device location.

77. A user device as recited in claim 62 wherein the user device generates the suggestion data based on a user device location and content used at the user device.

78. A user device as recited in claim 62 wherein the user device generates the suggestion data based on an external source to the user device.

79. A user device as recited in claim 62 wherein the user device generates the suggestion data based on a website external to a content processing system.

80. A user device as recited in claim 62 wherein the user device generates the suggestion data based on predicted popularity.

81. A user device as recited in claim 62 wherein the user device generates the suggestion data based on a ranked list of content from an external source.

82. A user device as recited in claim 62 wherein the user device generates the suggestion data based on content from an external source and content used at a user device.

83. A user device as recited in claim 62 wherein the user device generates the suggestion data based on content from an external source and content used at a user device and user device location.

* * * * *